US008308541B2

(12) United States Patent
Munakata

(10) Patent No.: US 8,308,541 B2
(45) Date of Patent: Nov. 13, 2012

(54) GAMING MACHINE FOR BETTING CARD GAME INCLUDING MAIN CARD GAME AND AUXILIARY CARD GAME, AND CONTROLLING METHOD THEREOF

(75) Inventor: Hiroki Munakata, Koto-ku (JP)

(73) Assignees: Universal Entertainment Corporation, Tokyo (JP); Aruze Gaming America, Inc., Las Vegas, NV (US)

( * ) Notice: Subject to any disclaimer, the term of this patent is extended or adjusted under 35 U.S.C. 154(b) by 190 days.

(21) Appl. No.: 12/831,696

(22) Filed: Jul. 7, 2010

(65) Prior Publication Data

US 2011/0045887 A1 Feb. 24, 2011

(30) Foreign Application Priority Data

Aug. 19, 2009 (JP) ................................ 2009-190453

(51) Int. Cl.
*A63F 13/00* (2006.01)

(52) U.S. Cl. ........................................................ 463/12

(58) Field of Classification Search .................. 273/292; 463/12

See application file for complete search history.

(56) References Cited

U.S. PATENT DOCUMENTS

| | | | | |
|---|---|---|---|---|
| 6,789,801 | B2 | 9/2004 | Snow | |
| 2006/0249906 | A1 * | 11/2006 | Mugnolo et al. | 273/292 |
| 2010/0327529 | A1 * | 12/2010 | Goodwin | 273/292 |

* cited by examiner

*Primary Examiner* — Arthur O. Hall
*Assistant Examiner* — Jeffrey Wong
(74) *Attorney, Agent, or Firm* — Lexyoume IP Meister, PLLC.

(57) ABSTRACT

A gaming machine for a betting card game including a main card game and an auxiliary card game and a method of controlling the same, including: by a controller, accepting a bet of a first wager for participation in the main card game; accepting a bet of a second wager as an option for participation in the auxiliary card game; determining an outcome of the main card game in accordance with a game rule for the main card game on a basis of at least two cards being displayed and disclosed for the main card game after termination of acceptance of a bet of the first wager; and determining an outcome of the auxiliary card game in accordance with a game rule for the auxiliary card game on a basis of first and second cards being displayed for the main card game after termination of acceptance of a bet of the second wager.

16 Claims, 33 Drawing Sheets

(PROCEDURES OF BLACKJACK GAME)

FIG. 2

| CARD RANK | NUMBER TO BE COUNTED |
|---|---|
| A (ACE) | 1 OR 11 |
| 2~9 | 2~9 |
| 10 | 10 |
| J (JACK) | 10 |
| Q (QUEEN) | 10 |
| K (KING) | 10 |

FIG. 3

| SUM OF CARDS | ACTION OF DEALER |
|---|---|
| 16 OR LESS | HIT |
| 17 OR MORE | STAY |

FIG. 4

| WINNER OF BASIC GAME | TYPE OF PAYOUT | |
|---|---|---|
| PLAYER | BLACKJACK | 1.5 TIMES PAYOUT |
| | OTHER THAN BLACKJACK | 1 TIME PAYOUT |
| DEALER | COLLECT | |
| DRAW (TIE) | RETURN | |

FIG. 5

| WINNING PATTERN | CONDITION OF ESTABLISHMENT | AMOUNT OF PAYOUT |
|---|---|---|
| ULTIMATE MATCH | FIRST TWO CARDS OF PLAYER AND FIRST TWO CARDS OF DEALER INCLUDE A AND J OF SAME SUITS (EXAMPLE: PLAYER J SPADE + A HEART; DEALER A HEART + J SPADE) | 10 TIMES PAYOUT |
| EXCELLENT MATCH | FIRST TWO CARDS OF PLAYER ARE ENTIRELY SAME AS FIRST TWO CARDS OF DEALER (EXCEPT ULTIMATE MATCH) (EXAMPLE: PLAYER 9 CLUB + 8 DIAMOND; DEALER 8 DIAMOND + 9 CLUB) | 5 TIMES PAYOUT |
| DOUBLE NUMBER | FIRST TWO CARDS OF PLAYER AND FIRST TWO CARDS OF DEALER HAVE SAME NUMBERS BUT DIFFERENT SUITS (EXAMPLE: PLAYER 2 DIAMOND + 9 SPADE; DEALER 2 DIAMOND + 9 HEART | 2 TIMES PAYOUT |
| SINGLE MATCH | ONE OF FIRST TWO CARDS OF PLAYER COMPLETELY MATCHES ONE OF FIRST TWO CARDS OF DEALER BUT OTHER CARDS ARE DIFFERENT (EXAMPLE: PLAYER 3 CLUB + 10 DIAMOND; DEALER 3 CLUB + 2 DIAMOND) | 1.5 TIMES PAYOUT |
| SUITS PAIR | FIRST TWO CARDS OF PLAYER AND FIRST TWO CARDS OF DEALER HAVE SAME SUITS BUT DIFFERENT NUMBERS (EXAMPLE: PLAYER 5 SPADE + 2 HEART; DEALER 3 HEART+ 6 SPADE) | 1 TIME PAYOUT |

GAMING MACHINE FOR BETTING CARD GAME INCLUDING MAIN CARD GAME AND AUXILIARY CARD GAME, AND CONTROLLING METHOD THEREOF

CROSS REFERENCE TO RELATED APPLICATIONS

This application is based upon and claims the benefit of priority from the prior Japanese Patent Application No. 2009-190453, filed on Aug. 19, 2009, the entire contents of which are incorporated herein by reference.

BACKGROUND OF THE INVENTION

Field of the Invention

The present invention relates to a gaming machine for a betting card game using one or more decks of cards, and to a controlling method thereof.

There have heretofore been known various betting card games using one or more decks of cards. In such a card game, a participant can make only a single bet per game, and accordingly can enjoy only a limited number or types of games in comparison with time consumed for the games.

In this regard, U.S. Pat. No. 6,789,801 discloses a card game in which a participant guesses a specific outcome of the card game and makes a side bet, in addition to a normal bet on the card game.

SUMMARY OF THE INVENTION

However, the card game disclosed in U.S. Pat. No. 6,789,801 is designed for a participant to play practically only one type of game (a baccarat game) and therefore lacks a variety of games.

The present invention has been made to solve this problem. An object of the present invention is to provide a gaming machine capable of offering card games that allow a participant to feel a sense of satisfaction, and a controlling method thereof.

A first aspect of the present invention is a gaming machine comprising: a gaming terminal configured to make a wager on a betting card game including a main card game and an auxiliary card game; a memory configured to store a first game rule for the main card game and a second game rule for the auxiliary card game; and a controller configured to: (a) accept a bet of a first wager made at the gaming terminal for participation in the main card game; (b) accept a bet of a second wager made at the gaming terminal as an option for participation in the auxiliary card game; (c) determine an outcome of the main card game in accordance with the first game rule, on a basis of at least two cards being displayed and disclosed for the main card game after termination of acceptance of a bet of the first wager; and (d) determine an outcome of the auxiliary card game in accordance with the second game rule, on a basis of first and second cards being displayed for the main card game after termination of acceptance of a bet of the second wager.

According to the first aspect of the present invention, when two or more cards for the main card game are displayed for the participant to play the main card game, the auxiliary card game, in which the outcome is determined based on the contents of the first and second cards, is played at the same time.

Hence, every time the participant plays the main card game by making the first wager, the participant can optionally play the auxiliary card game by making the second optional wager. In this way, the participant can play multiple games at the same time by making bets on the main and auxiliary card games separately during each card game.

The gaming machine may further comprise: a display device adapted to show the cards as displayed, wherein the controller drives the display device to show an image to specify the first and second cards as displayed, when determining the outcome of the auxiliary card game.

According to the above-described configuration, the auxiliary card game is played simultaneously with the main card game every time the main card game is played on the gaming machine of the first aspect. Moreover, when the outcome of the auxiliary card game is determined, the first and second cards are specified in the image displayed on the display device. Here, the first and second cards are displayed and disclosed for the main card game, and serve as the basis of determination for the outcome of the auxiliary card game.

Hence the participant can check which cards out of two or more cards displayed for the main card game serve as the basis of determination for the outcome of the auxiliary card game, in the image displayed on the display device.

The main card game may include a blackjack game.

According to the above-described configuration, every time playing the blackjack game which is a betting target of the first wager, the participant can optionally play the auxiliary card game which is a betting target of the second optional wager on the gaming machine of the first aspect. In this way, the participant can play the blackjack game and the auxiliary card game at the same time during each card game.

A second aspect of the present invention is a gaming machine comprising: a gaming terminal configured to make a wager on a betting card game including a main card game and an auxiliary card game; a memory configured to store a first game rule for the main card game and a second game rule for the auxiliary card game; and a controller configured to: (a) accept a bet of a first wager made at the gaming terminal for participation in the main card game; (b) accept a bet of a second wager made at the gaming terminal as an option for participation in the auxiliary card game; (c) determine an outcome of the auxiliary card game in accordance with the second game rule, on a basis of first and second cards being displayed for the main card game after termination of acceptance of a bet of the second wager; and (d) determine an outcome of the main card game in accordance with the first game rule, on a basis of at least two cards being displayed and disclosed for the main card game after determination of the outcome of the auxiliary game and termination of acceptance of a bet of the first wager.

According to the second aspect, when two or more cards for the main card game are displayed for the participant to play the main card game, the auxiliary card game, in which the outcome is determined based on the contents of the disclosed first and second cards, is played at the same time.

Hence every time playing the main card game by making the first wager, the participant can optionally play the auxiliary card game during the main game by making the second optional wager. In this way, the participant can play multiple games at the same time by making bets on the main and auxiliary card games separately during each card game.

Moreover, the auxiliary card game is played during the main card game and the outcome of the auxiliary card game is determined prior to the cut-off time for making the first wager on the main card game.

Hence a sense of satisfaction of the participant can be enhanced for the main card game by allowing the participant to make a final decision of an amount of the first wager on the main card game after checking of the outcome of the auxiliary card game.

The gaming machine may further comprise: a display device adapted to show the cards as displayed, wherein the controller drives the display device to show an image to specify the first and second cards as displayed, when determining the outcome of the auxiliary card game.

According to the above-described configuration, the auxiliary card game is played simultaneously with the main card game every time the main card game is played on the gaming machine of the second aspect. Moreover, when the outcome of the auxiliary card game is determined, the first and second cards are specified in the image displayed on the display device. Here, the first and second cards are displayed and disclosed for the main card game, and serve as the basis of determination for the outcome of the auxiliary card game.

Hence the participant can check which cards out of two or more cards displayed for the main card game serve as the basis of determination for the outcome of the auxiliary card game, in the image displayed on the display device.

The main card game may include a blackjack game.

According to the above-described configuration, every time playing the blackjack game which is a betting target of the first wager, the participant can optionally play the auxiliary card game which is a betting target of the second optional wager on the gaming machine of the second aspect. In this way, the participant can play the blackjack game and the auxiliary card game at the same time during each card game.

A third aspect of the present invention is a gaming machine comprising: a gaming terminal configured to make a wager on a betting card game including a main card game and an auxiliary card game; a memory configured to store a first game rule for the main card game and a second game rule for the auxiliary card game; a display device adapted to show cards displayed for the main card game; and a controller configured to: (a) accept a bet of a first wager made at the gaming terminal for participation in the main card game; (b) accept a bet of a second wager made at the gaming terminal as an option for participation in the auxiliary card game; (c) determine an outcome of the auxiliary card game in accordance with the second game rule, on a basis of first and second cards being displayed for the main card game after termination of acceptance of a bet of the second wager, and drive the display device to show the outcome of the auxiliary card game as determined; and (d) determine an outcome of the main card game in accordance with the first game rule, on a basis of at least two cards being displayed and disclosed for the main card game after driving the display device to show the outcome of the auxiliary card game and termination of acceptance of a bet of the first wager, and drive the display device to show the outcome of the main card game as determined.

According to the third aspect, when two or more cards for the main card game are displayed for the participant to play the main card game, the auxiliary card game, in which the outcome is determined based on the contents of the disclosed first and second cards, is played at the same time.

Hence every time playing the main card game by making the first wager, the participant can optionally play the auxiliary card game during the main game by making the second optional wager. In this way, the participant can play multiple games at the same time by making bets on the main and auxiliary card games separately during each card game.

Moreover, the auxiliary card game is played during the main card game and the outcome of the auxiliary card game is determined prior to the cut-off time for making the first wager on the main card game.

Hence a sense of satisfaction of the participant can be enhanced for the main card game by allowing the participant to make the final decision of an amount of the first wager on the main card game after checking of the outcome of the auxiliary card game.

Furthermore, the outcome of the auxiliary game determined during the main card game is displayed on the display device. Accordingly, the outcome of the auxiliary game is reliably sent to the participant by the display device on which the cards are displayed for the main card game.

Hence a sense of satisfaction of the participant can be reliably enhanced for the main card game by reliably allowing the participant to make the final decision of an amount of the first wager on the main card game after checking of the outcome of the auxiliary card game.

The controller may drive the display device to show an image to specify the first and second cards as displayed when driving the display device to show the outcome of the auxiliary card game.

According to the above-described configuration, when the outcome of the auxiliary card game is determined on the gaming machine of the third aspect, the first and second cards are specified by the image displayed on the display device. Here, the first and second cards are displayed and disclosed for the main card game, and serve as the basis of determination for the outcome of the auxiliary card game.

Hence the participant can check which cards out of two or more cards displayed for the main card game serve as the basis of determination for the outcome of the auxiliary card game, in the image displayed on the display device.

The main card game may include a blackjack game.

According to the above-described configuration, every time playing the blackjack game which is a betting target of the first wager, the participant can optionally play the auxiliary card game which is a betting target of the second optional wager on the gaming machine of the third aspect. In this way, the participant can play the blackjack game and the auxiliary card game at the same time during each card game.

A fourth aspect of the present invention is a method of controlling a gaming machine for a betting card game including a main card game and an auxiliary card game, the method comprising: by a controller, accepting a bet of a first wager made at a gaming terminal for participation in the main card game; accepting a bet of a second wager made at the gaming terminal as an option for participation in the auxiliary card game; determining an outcome of the main card game in accordance with a game rule for the main card game stored in a memory, on a basis of at least two cards being displayed and disclosed for the main card game after termination of acceptance of a bet of the first wager; and determining an outcome of the auxiliary card game in accordance with a game rule for the auxiliary card game stored in the memory, on a basis of first and second cards being displayed for the main card game after termination of acceptance of a bet of the second wager.

According to the fourth aspect, when two or more cards for the main card game are displayed for the participant to play the main card game, the auxiliary card game, in which the outcome is determined based on the contents of the first and second cards, is played at the same time.

Hence every time playing the main card game by making the first wager, the participant can optionally play the auxiliary card game by making the second optional wager. In this way, the participant can play multiple games at the same time by making bets on the main and auxiliary card games separately during each card game.

The method may further comprise: by the controller, driving a display device to show an image to specify the first and second cards as displayed when determining the outcome of the auxiliary card game.

According to the above-described configuration, the auxiliary card game is played simultaneously with the main card game every time the main card game is played in the controlling method for a gaming machine of the fourth aspect. Moreover, when the outcome of the auxiliary card game is determined, the first and second cards are specified in the image displayed on the display device. Here, the first and second cards are displayed and disclosed for the main card game, and serve as the basis of determination for the outcome of the auxiliary card game.

Hence the participant can check which cards out of two or more cards displayed for the main card game serve as the basis of determination for the outcome of the auxiliary card game, in the image displayed on the display device.

The main card game may include a blackjack game

According to the above-described configuration, every time playing the blackjack game which is a betting target of the first wager, the participant can optionally play the auxiliary card game which is a betting target of the second optional wager in the controlling method for a gaming machine of the fourth aspect. In this way, the participant can play the blackjack game and the auxiliary card game at the same time during each card game.

Here, in the gaming machine according to any of the first to third aspects, the controller may also be configured to display a single established winning pattern, which is set to provide the highest payout according to a game rule for the auxiliary card game, on the display device as the determined outcome of the auxiliary card game when the outcome of the auxiliary card game is simultaneous establishment of multiple winning patterns as defined in the game rule for the auxiliary card game.

Similarly, in the controlling method for a gaming machine according to the fourth aspect, the method may also be configured as follows. Specifically, when the outcome of the auxiliary card game is simultaneous establishment of multiple winning patterns, the controller may determine a single established winning pattern, which is set to provide the highest payout according to the game rule for the auxiliary card game, as the outcome of the auxiliary card game in the step of determining the outcome of the auxiliary card game in accordance with the game rule for the auxiliary card game based on the first and second cards displayed for the main card game after stopping acceptance of the bet of the first wager on the gaming terminal for the participant to play the main card game.

BRIEF DESCRIPTION OF THE DRAWINGS

FIG. 2 is a list showing the basic way of counting numbers represented by cards in the blackjack game.

FIG. 3 is a list showing an example of a hit and stay chart for cards of a dealer in a basic game of blackjack.

FIG. 4 is a list showing an example of payout rules corresponding to a bet made by a player in the basic game of blackjack.

FIG. 5 is a list showing an example of payout rules corresponding to a bet made by the player in a side bet game of blackjack.

DETAILED DESCRIPTION OF THE EMBODIMENTS

Now, embodiments of the present invention will be described below with reference to the accompanying drawings.

A gaming machine and a controlling method thereof according to a first embodiment of the present invention will be described with reference to FIG. 1 to FIG. 32.

Figure 1:
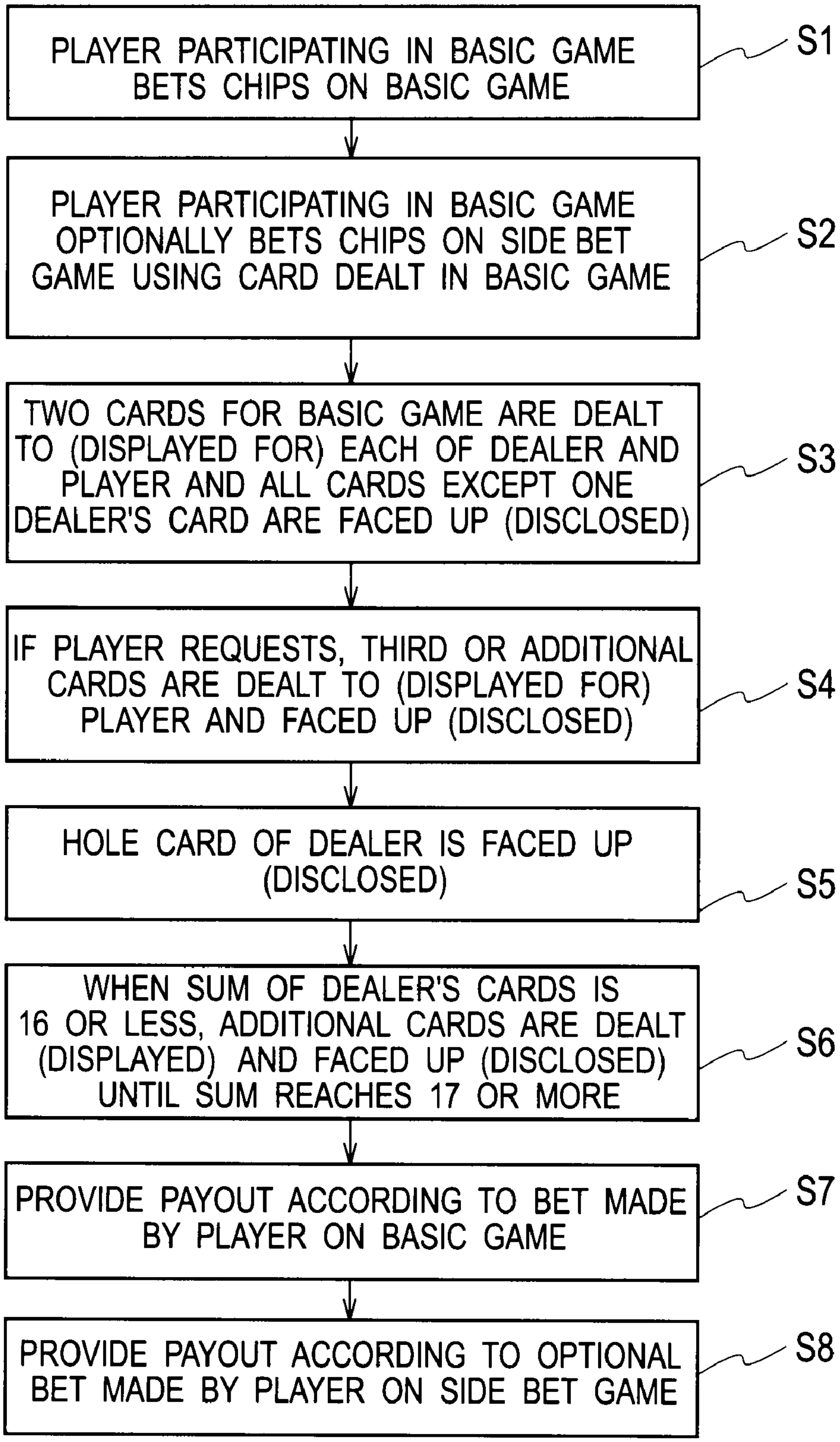
FIG. 1 is a flowchart showing an example of procedures of a blackjack game on a gaming machine employing a controlling method according to a first embodiment of the present invention.

FIG. 1 is a flowchart showing an example of procedures of a blackjack game on a gaming machine employing a controlling method according to a first embodiment of the present invention. FIG. 2 is a list showing the basic way of counting numbers represented by cards in the blackjack game. FIG. 3 is a list showing an example of a hit and stay chart for cards of a dealer in a basic game of blackjack. FIG. 4 is a list showing an example of payout rules corresponding to a bet made by a player in the basic game of blackjack. FIG. 5 is a list showing an example of payout rules corresponding to a bet made by the player in a side bet game of blackjack.

A blackjack game is a game to compete for a better hand between a dealer and a player, who is a participant in the game. This blackjack game is played as a basic game (a main card game) in this embodiment.

In the basic game, the player participating in the game firstly bets chips as game media on the basic game as shown in step S1 of the flowchart in FIG. 1. After the player bets the chips on the basic game, cards are dealt to each of the dealer and the player as shown in step S3.

In this step S3, two cards are dealt to (displayed for) each of the dealer and the player in the first place. At this time, one out of the two cards of the dealer and two cards of the player are up cards which are faced up (disclosed). The remaining card of the dealer is a hole card which is faced down.

Here, the player to whom two cards are dealt (displayed) together with the dealer is entitled to request (hit) displaying a third or any additional cards as appropriate. Upon this request, the third or any additional cards dealt face-up (displayed and disclosed) one-by-one to the player as long as the request of the player continues. The hand of the player is fixed at a point when the player stops requesting any subsequent cards (stay).

As the hand of the player is fixed, the face-down card of the dealer (a hole card) is then faced up (disclosed) in the next step S5. Thereafter, a total score of the two cards of the dealer is calculated.

Here, in calculation of the score of the cards, the cards are counted by using numbers shown in the table in FIG. 2 corresponding to ranks thereof. Specifically, an “A (ace)” card is counted either as “1” or “11”. Cards of “2” to “9” are simply counted as “2” to “9”, respectively. Each of the cards “10”, “J (jack)”, “Q (queen)”, and “K (king)” is counted as “10”. Hence, the score of the cards of the dealer or the player is the sum of the numbers of the cards dealt to the dealer or the player.

When the score of the dealer thus calculated is 16 or less, this score corresponds to “hit” as indicated on the hit and stay chart in FIG. 3. Accordingly, another card is dealt face-up (displayed and disclosed) to the dealer in step S6. When the score of the dealer is 17 or more, this score corresponds to “stay” as indicated on the hit and stay chart in FIG. 3. Accordingly, the hand of the dealer is fixed.

When the hands of the dealer and the player are fixed as described above, a win or loss between the dealer and the player is determined based on the scores of the cards. Then, as shown in step S7 of the flowchart in FIG. 1, a payout is provided according to the bet on the basic game made by the player on the basis of the win or loss thus determined. To provide the payout, the scores of the dealer and the player are calculated based on the cards of the dealer and the player in the first place. Then, the win or loss between the dealer and the player is checked by using the calculated scores of the dealer and the player. Specifically, the person having the score close to (or equal to) “21” is a winner of the game, whereas the game is a tie if the scores of the dealer and the player are the same. If the player wins, the content of the payout for the bet made on the basic game by the player is determined.

The contents of the payout for the basic game may be defined as shown on the list in FIG. 4, for example. Specifically, if the player wins by a blackjack (a combination of an “A (ace)” with any one of a “J (jack)”, a “Q (queen)”, and a “K (king)”), a payout is provided in an amount of chips 1.5 times the chips bet on the game. If the player wins by a hand other than the blackjack, the player is provided with a payout in the same amount as (1 time) the chips bet on the game. The chips bet on the game are collected by the dealer when the dealer wins, whereas the chips bet on the game are returned to the player when the game is a tie. The above-described contents of the payout for the bet made on the basic game by the player may also be defined in a different manner as a local rule in each casino.

In this embodiment, the contents of the payout for the basic game as shown on the list in FIG. 4 correspond to a game rule for the main card game.

Moreover, according to a method of playing a card game of the present invention, an optional side bet game (an auxiliary card game) is played simultaneously with execution of the above-described blackjack game. According to the gaming machine of the first embodiment of the present invention, this side bet game is executed by using first and second cards dealt to the dealer and the player per basic game.

In this embodiment, there are five winning patterns in the side bet game which generate payouts for the player as shown on the list in FIG. 5, namely, "ULTIMATE MATCH", "EXCELLENT MATCH", "DOUBLE NUMBER", "SINGLE MATCH", and "SUITS PAIR".

The "ULTIMATE MATCH" is a case where the cards of both of the dealer and the player include an "A (ace)" and a "J (jack)" and the suit of the "A (ace)" cards and the suit of the "J (jack)" cards coincide with each other (the case where the cards of both of the dealer and the player include a combination of A of heart and J of spade, for example).

The "EXCELLENT MATCH" is a case where the cards of the dealer and the player include a combination of two cards having the same ranks and the same suits except for the combination of the "A (ace)" and the "J (jack)" (the case where the cards of both of the dealer and the player include a combination of 8 of diamond and 9 of club, for example).

The "DOUBLE NUMBER" is a case where the cards of the dealer and the player include a combination of two cards having the same ranks (whereas the suits are partially or entirely different) (the case where the cards the dealer include 2 of diamond and 9 of heart while the cards of the player include 2 of diamond and 9 of spade, for example).

The "SINGLE MATCH" is a case where one of the cards of the dealer and one of the cards of the player have the same rank as well as the same suit while the other card of the dealer and the other card of the player have different ranks (irrespective of whether the suits are the same or different) (the case where the cards of the dealer include 3 of club and 2 of diamond while the cards of the player include 3 of club and 10 of diamond, for example).

The "SUITS PAIR" is a case where the cards of the dealer and the player share the combinations of the same suits but different ranks (the case where the cards of the dealer include 3 of heart and 5 of spade while the cards of the player include 2 of heart and 6 of spade, for example).

The player participating in the basic game can participate in the side bet game, which is configured to generate the payouts upon establishment of the above-described winning patterns, by betting chips thereon before the start of the basic game. The decision of whether or not to participate in this side bet game is at the player's discretion.

In the above-described side bet game, the player participating in the game bets the chips on the basic game in step S1 of the flowchart in FIG. 1 and then voluntarily bets the chips on the side bet game in step S2. Then, after the payout is provided in step S7 according to the bet on the basic game made by the player, a payout is provided in step S8 according to the voluntary (optional) bet on the side bet game made by the player.

Contents of the payout according to the side bet game may be defined as shown on the list in FIG. 5, for example. Specifically, a payout is provided in an amount of chips 10 times the chips bet on the side bet game when the "ULTIMATE MATCH" is established. A payout is provided in an amount of chips 5 times the chips bet on the side bet game when the "EXCELLENT MATCH" is established. A payout is provided in an amount of chips 2 times the chips bet on the side bet game when the "DOUBLE NUMBER" is established. A payout is provided in an amount of chips 1.5 times the chips bet on the side bet game when the "SINGLE MATCH" is established. A payout is provided in the same amount as (1 time) the chips bet on the side bet game when the "SUITS PAIR" is established. If none of these winning patterns are established, the chips bet on the side bet game by the player are collected.

In this embodiment, the contents of the payout for the side bet game as shown on the list in FIG. 5 correspond to a game rule for the auxiliary card game.

Incidentally, the above-described bet of the chips on the basic game in step S1 and the bet of the chips on the side bet game in step S2 may be carried out in reverse order or at the same time. Meanwhile, the payout according to the bet made on the basic game by the player in step S7 and the payout according to the bet made on the side bet game by the player in step S8 may be carried out in reverse order or at the same time.

A gaming terminal can be used in order to: allow the player to make bets on the basic game of blackjack and the side bet game as described above; and execute the basic game and the side game.

Now, a gaming terminal according to the first embodiment of the present invention will be described below with reference to FIG. 6 to FIG. 20.

Figure 6:
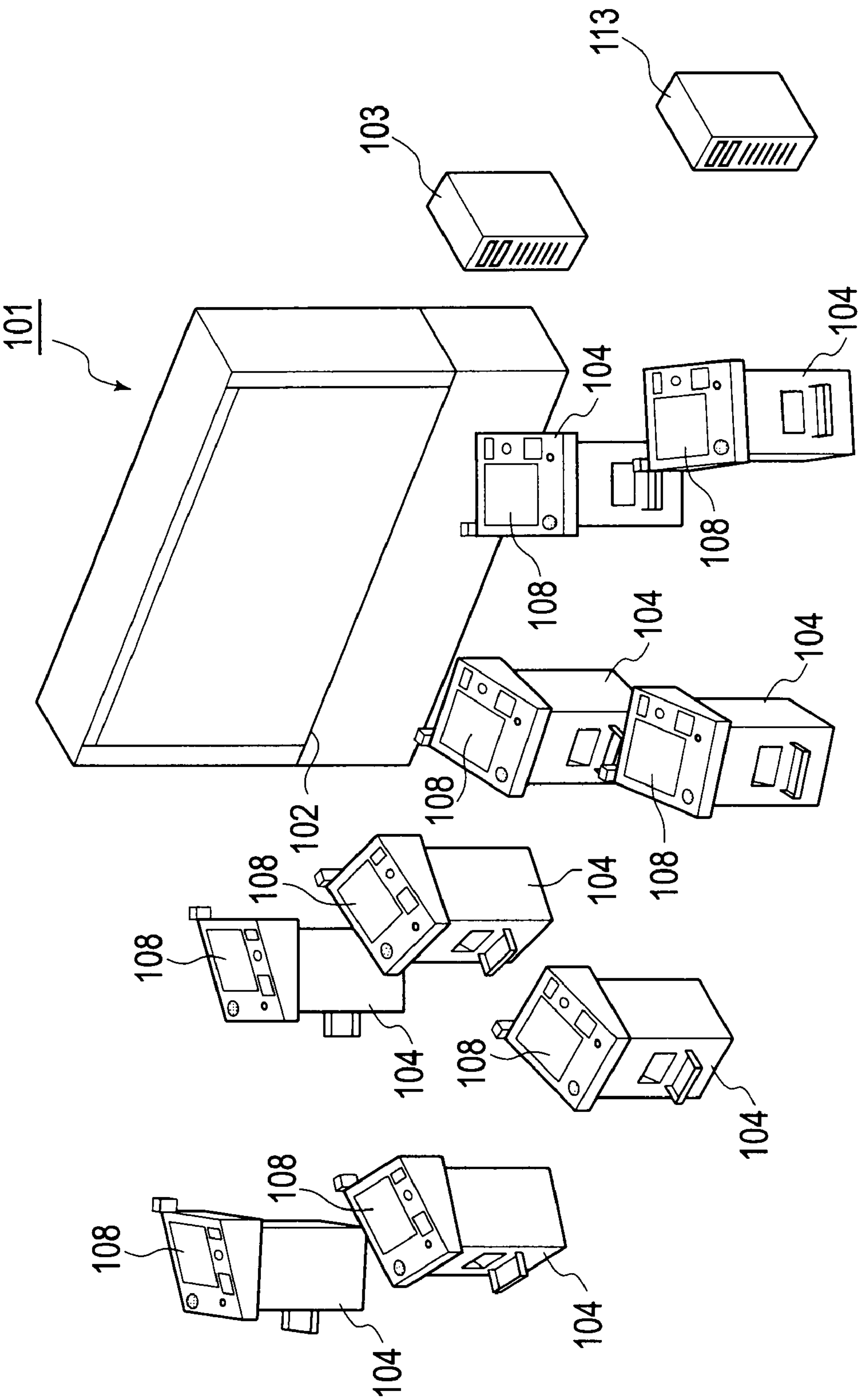
FIG. 6 is an external perspective view showing a schematic configuration of a blackjack game system including gaming terminals according to the first embodiment of the present invention.
Figure 7:
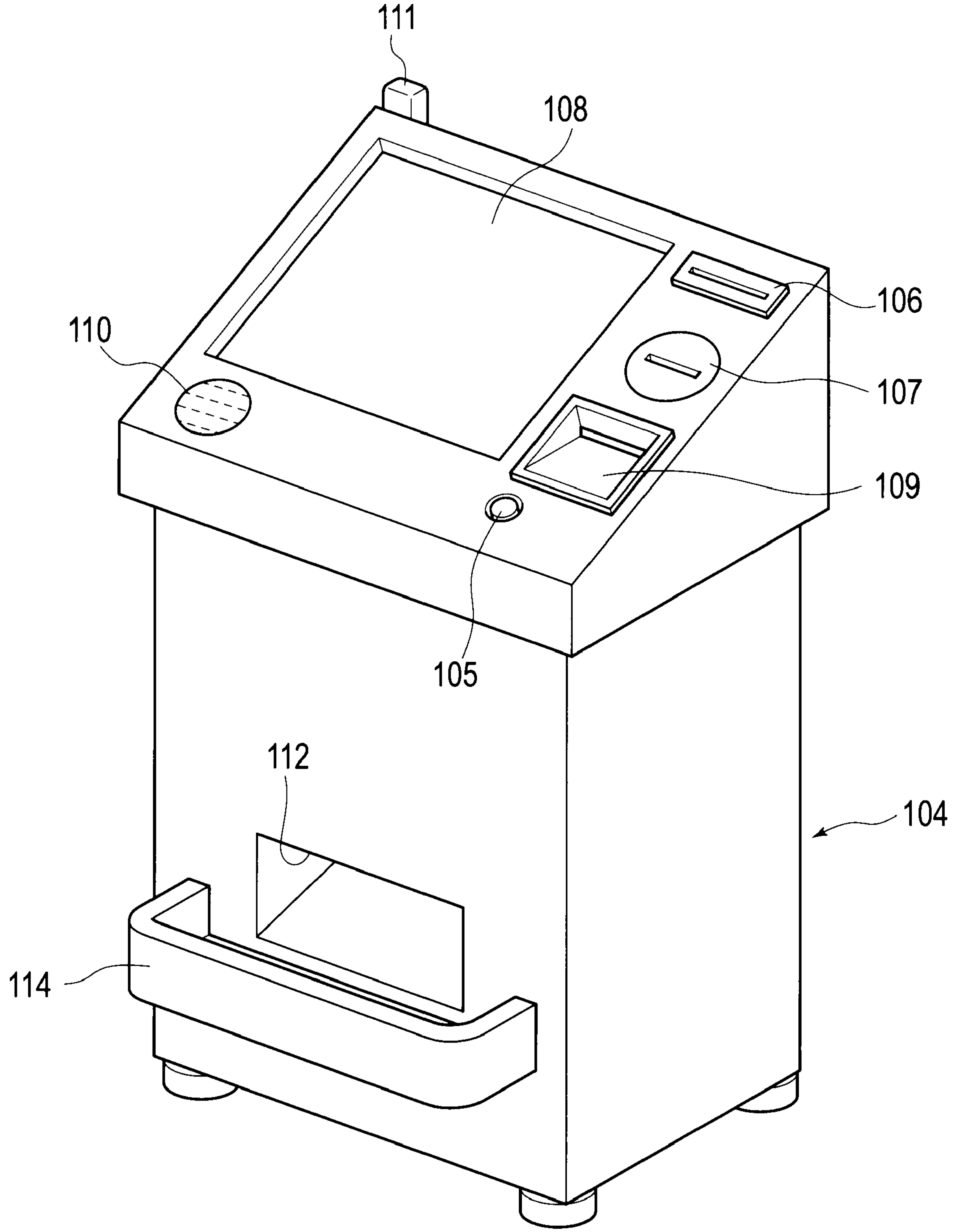
FIG. 7 is a perspective view showing a gaming terminal in FIG. 6.
Figure 8:
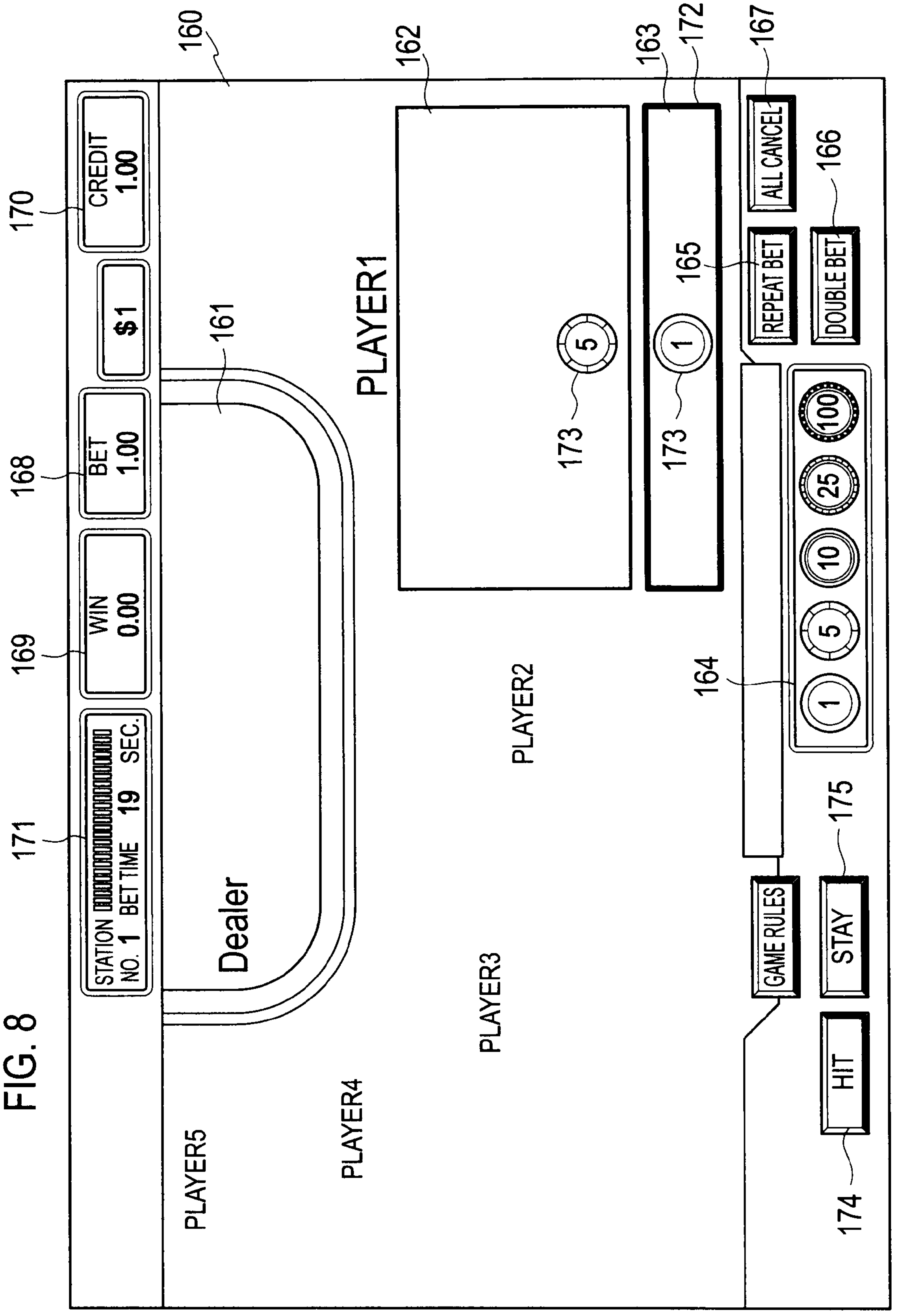
FIG. 8 is a view showing an example of an image to be displayed on a display unit provided on the gaming terminal in FIG. 7.

FIG. 6 is an external perspective view showing a schematic configuration of a blackjack game system including gaming terminals according to the first embodiment of the present invention. FIG. 7 is a perspective view showing a gaming terminal in FIG. 6. FIG. 8 is a view showing an example of an image to be displayed on a display unit provided on the gaming terminal in FIG. 7.

As shown in FIG. 6, multiple gaming terminals 104 (corresponding to the gaming machines of the present invention) according to the first embodiment of the present invention are provided in a blackjack game system 101. Moreover, the blackjack game system 101 includes a common display unit 102, a game controller 103, and a server 113 in addition to the multiple gaming terminals 104. The gaming terminals 104 can be connected to the game controller 103 and the server 113 by use of a local area network and the like. The game controller 103 can be connected to the common display unit 102 by use of a dedicated communication cable and the like.

The basic game of blackjack is displayed on the common display unit 102 under control of the game controller 103 and the server 113. Players use the multiple gaming terminals 104, which are arranged to surround the common display unit 102, in order to participate in the basic game of blackjack to be displayed on the common display unit 102 and to participate voluntarily in the side bet game which is executed by utilizing the cards used for the basic game. In this embodiment, the blackjack game system 101 includes nine gaming terminals 104. Therefore, up to nine players can participate in the basic game of the blackjack and the side bet game at the same time.

The basic games of blackjack to be displayed on the common display unit 102 are repeatedly executed at a predetermined time cycle under control of the game controller 103 and the server 113. Therefore, bet periods (acceptance periods) to allow bets to be made on current sessions of the basic game and the side bet game using the gaming terminals 104 are restricted by the progress of the games. Accordingly, when the bet periods for allowing bets to be made on the current sessions of the basic game and the side bet game are terminated, it is no longer possible to make any bets on the current sessions of the basic game and the side bet game using the gaming terminals 104 from completion of the current session of the basic game to completion of the payouts according to the basic game and the side bet game. The subsequent bet periods start after completion of the payouts according to the basic game and the side bet game so as to allow bets to be made on the subsequent sessions of the basic game or the side bet game using the gaming terminals 104.

As shown in FIG. 8, a BET screen 160 corresponding to the basic game to be displayed on the common display unit 102 and to the side bet game which is executed by utilizing the cards used for the basic game is displayed on a display unit 108 of each of the gaming terminals 104. Display contents of this BET screen 160 will be described in detail later.

Figure 9:
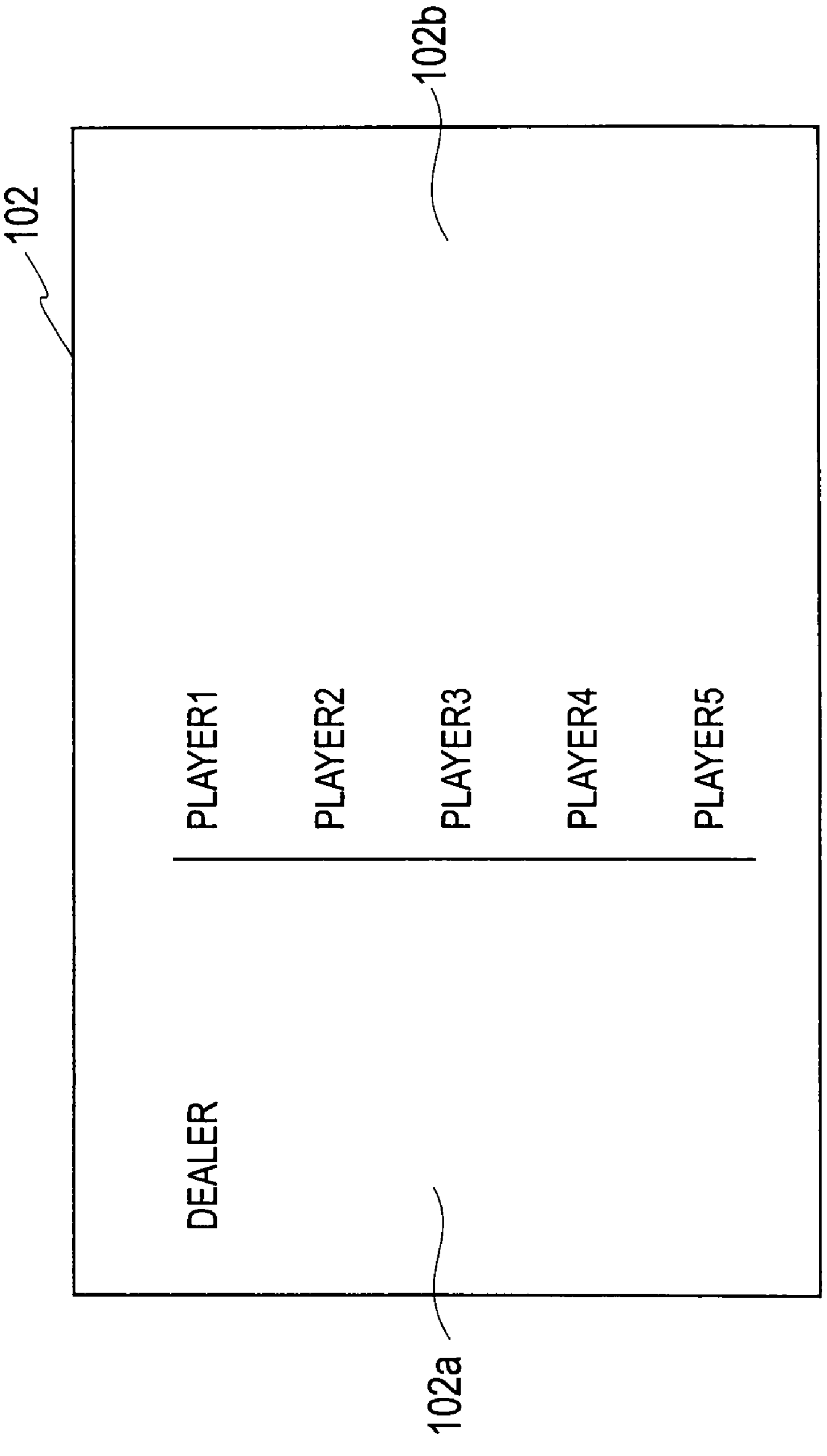
FIG. 9 is a view showing a display example of the basic game of blackjack to be displayed on a common display unit in FIG. 6.

FIG. 9 is a display example of a blackjack game to be displayed on the common display unit 102 which provided in the blackjack game system 101 in FIG. 6. As shown in FIG. 9, the basic game of blackjack is displayed on the common display unit 102. Accordingly, the cards dealt to the dealer are displayed in a dealer card area 102*a* on the common display unit 102 while the cards dealt to the players of the gaming terminals 104 are displayed in a player card area 102*b* thereon.

Figure 10:
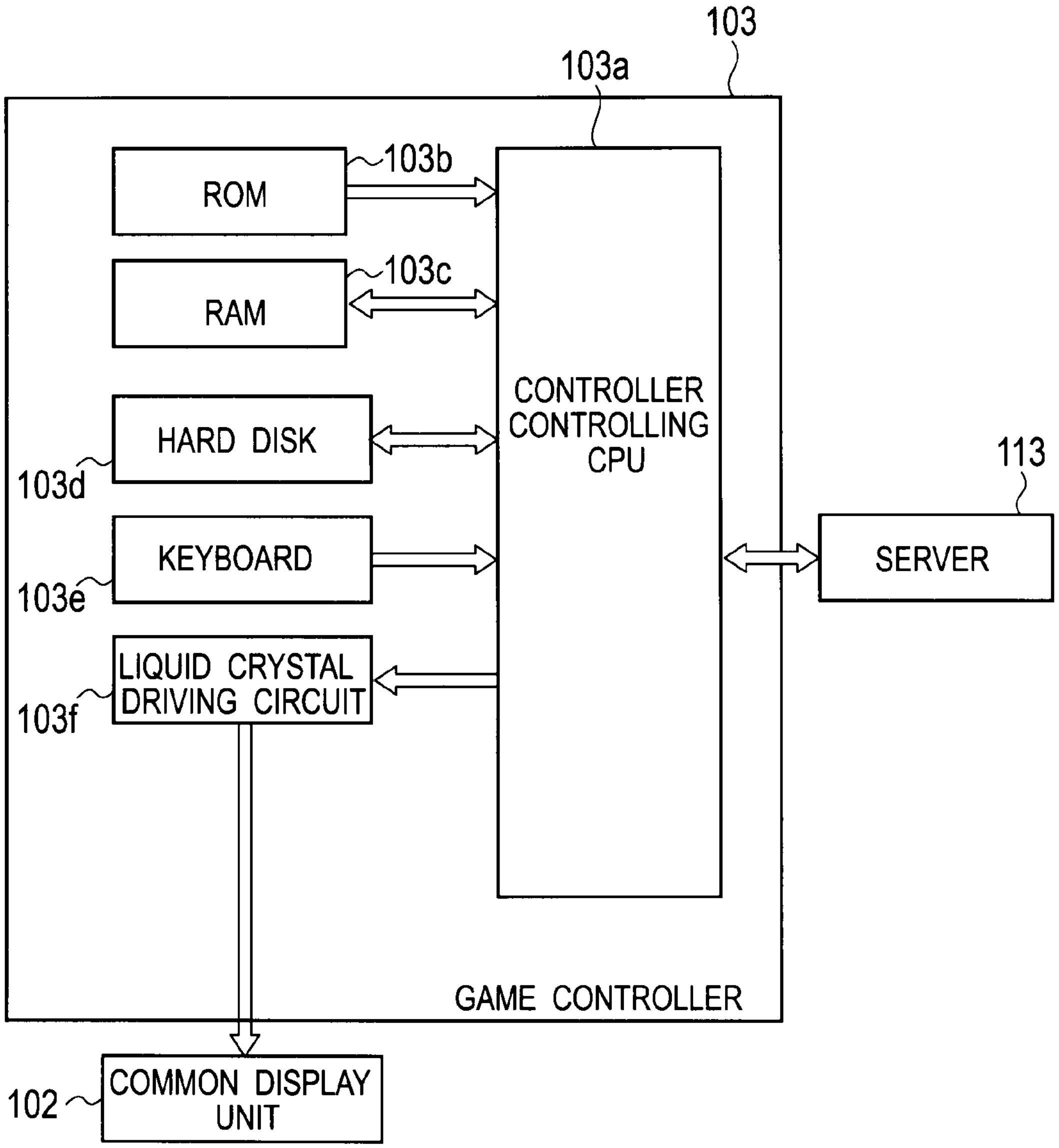
FIG. 10 is a block diagram showing an internal configuration of a game controller in FIG. 6.

FIG. 10 is a block diagram showing an internal configuration of the game controller 103. As shown in FIG. 10, the game controller 103 includes a controller controlling CPU (central processing unit) 103*a* to execute overall control of the game controller 103, a ROM (read-only memory) 103*b*, a RAM (random access memory) 103*c*, a hard disk 103*d*, a keyboard 103*e*, and a liquid crystal driving circuit 103*f* to which the common display unit 102 is connected.

A game program for displaying the basic game of blackjack on the common display unit 102 is stored and saved in the hard disk 103*d*, and the game program is downloaded to the RAM 103*c* in response to an instruction signal to be inputted by the keyboard 103*e*. Then, this game is executed under control performed by the controller controlling CPU 103*a* in accordance with this program in the ROM 103*b*. Meanwhile, the controller controlling CPU 103*a* performs a variety of processing based on inputted signals supplied from the server 113, and on data and programs stored in the ROM 103*b* and the RAM 103*c*. Then, the controller controlling CPU 103*a* transmits display signals to the common display unit 102 based on results of the processing, thereby initiatively controlling display of the basic game on the common display unit 102.

Next, a configuration of the gaming terminal 104 will be described. As shown in FIG. 7, the gaming terminal 104 includes at least: a medal insertion slot 107 to allow insertion of game media such as coins, chips, and medals each having currency values; and the above-described display unit 108 configured to display images related to the games, which are located on an upper face of the gaming terminal 104. The gaming terminal 104 accepts betting operations of the player using the medal insertion slot 107 and the display unit 108. The player can conduct the games developed thereon by operating a touch panel 150 (see FIG. 14) provided on a front face of the display unit 108 while watching the images displayed on the display unit 108. In the following description, the game media may be typically referred to as “medals” as appropriate.

Moreover, a payout button 105, a ticket printer 106, a bill insertion slot 109, and a speaker 110 are provided on the upper face of the gaming terminal 104 in addition to the medal insertion slot 107 and the display unit 108 described above. A medal payout opening 112 and a medal tray 114 are provided on a front face of the gaming terminal 104.

The payout button 105 is a button to input an instruction to provide a payout of credited medals from the medal payout opening 112 to the medal tray 114. The ticket printer 106 is configured to print a bar code encoding data including an amount of credits, date and time, an identification number of the gaming terminal 104, and the like and to output the data in the form of a bar coded ticket. The player is able to cause another gaming terminal 104 to read the bar coded ticket and to make bets on games with that gaming terminal 104 or to exchange the bar coded ticket with currencies and the like at a predetermined location in a gaming facility (such as a cashier in a casino).

The bill insertion slot 109 is configured to check the validity of bills and to accept authentic bills. Here, the bill insertion slot 109 may also be capable of reading the bar coded ticket. The speaker 110 is configured to play music, sound effects, and the like.

A WIN lamp 111 is provided in a position above the display unit 108 of each of the gaming terminals 104. When the player wins in the basic game played with the gaming terminal 104, the WIN lamp 111 of the gaming terminal 104 winning in the basic game is lit up. Note that the WIN lamp 111 is located in the position visible from all the arranged gaming terminals 104 (nine terminals in this embodiment) so that other players playing with the same blackjack game system 101 can always check the lightening.

A medal sensor (not shown) is provided inside the medal insertion slot 107 and is configured to check currency values of medals or the like inserted from the medal insertion slot 107 and to count the inserted medals. Meanwhile, a hopper (not shown) is provided inside the medal payout opening 112 and is configured to provide a payout of a predetermined number of medals from the medal payout opening 112.

The BET screen 160 shown in FIG. 8 is displayed on the display unit 108 of each of the gaming terminals 104. In a bet period set by the server 113 along the progress of the game, the player can bet chips in stock, which are credited in the gaming terminal 104 in the form of electronic information, on the basic game of blackjack and the side bet game by operating the touch panel 150 (see FIG. 14) provided on the front face of the display unit 108.

First, the BET screen 160 to be displayed on the display unit 108 will be described based on FIG. 8. On the BET screen 160, a dealer card area 161 and a player card area 162 are provided as areas for displaying cards for the basic game. Moreover, the BET screen 160 is provided with a side bet area 163 which is an area used for placing chips to be bet on the side bet game, and a chip box area 164 which is an area for displaying the chips in stock.

A REPEAT BET button 165, a DOUBLE BET button 166, and an ALL CANCEL button 167 are displayed at a lower part of the BET screen 160. A BET number indicator 168, a payout result indicator 169, and a credit number indicator 170 are displayed at an upper part of the BET screen 160.

The REPEAT BET button 165 is the button used for betting the chips on the basic game in the same number of credits as those in a precedent game. The DOUBLE BET button 166 is the button used for betting the chips to perform double down in the basic game. The ALL CANCEL button 167 is the button used for cancelling all the bets of chips on the basic game and the side bet game.

To bet the chips on the basic game of blackjack, the player firstly touches the player card area 162 to designate the basic game as a target for betting the chips. When the player touches the chips in stock in the chip box area 164 in this state, the touched types of chips can be bet on the basic game. Here, the chips in the same number of credits as those in the precedent game are bet on the basic game by touching the REPEAT BET button 165.

Meanwhile, to bet the chips on the side bet game, the player touches the side bet area 163 to designate the basic game as the target for betting the chips. By touching the chips in stock in the chip box area 164 in this state, the touched types of chips can be bet on the side bet game.

While the player bets the chips on the basic game, the number of the chips bet on the basic game in the current session by the player is displayed on the BET number indicator 168. While the player bets the chips on the side bet game, the number of the chips bet on the side bet game in the current session by the player is displayed thereon. The number of credits of a payout for the precedent game is displayed on the payout result indicator 169.

The credit number indicator 170 displays the number of credits (the number of chips) currently owned by the player. When the player bets the chips, the number of credits is reduced according to the number of bets (one credit to one bet). On the other hand, when a payout of credits is provided as a result of winning the game, the number of credits is increased according to the number of chips provided as the payout. Here, the game is over when the number of credits owned by the player is zero.

Meanwhile, a BET time indicator 171 is provided at the upper part of the BET screen 160. The BET time indicator 171 is configured to display time left for the player to bet. Here, a value "20" is displayed at the start of accepting a betting operation and the value is decremented by one every second, and the acceptance of the betting operation is terminated when the value is "0". Here, upon termination of acceptance of the betting operation, the display on the display unit 108 is fixed and thereafter the above-described betting operation cannot be executed.

Moreover, a frame 172 configured to show the game currently designated as the target for betting the chips by the player is displayed on the BET screen 160. This frame 172 is displayed to surround the player card area 162 as shown in FIG. 8 while the basic game is designated. Additionally, the frame 172 is displayed to surround the side bet area 163 while the side bet game is designated. Furthermore, chip marks 173 indicating the number of chips bet on the basic game and the side bet game at the present moment are displayed on the player card area 162 and the side bet area 163. Numerals indicated on the chips marks 173 represent the number of the chips bet on the games. For example, the chip mark 173 indicated with "5" and placed on the player card area 162 shows that 5 chips are bet on the basic game.

Further, a hit button 174 and a stay button 175 for allowing the player to designate whether or not the player requests for a third or more cards in the basic game of blackjack are displayed on the BET screen 160. When the player touches the hit button 174, another card is dealt face-up (displayed and disclosed) to the player and displayed on the player card area 162. When the player touches the stay button 175, the hand of the player is fixed and then it is the dealer's turn to proceed with the game.

Figure 11:
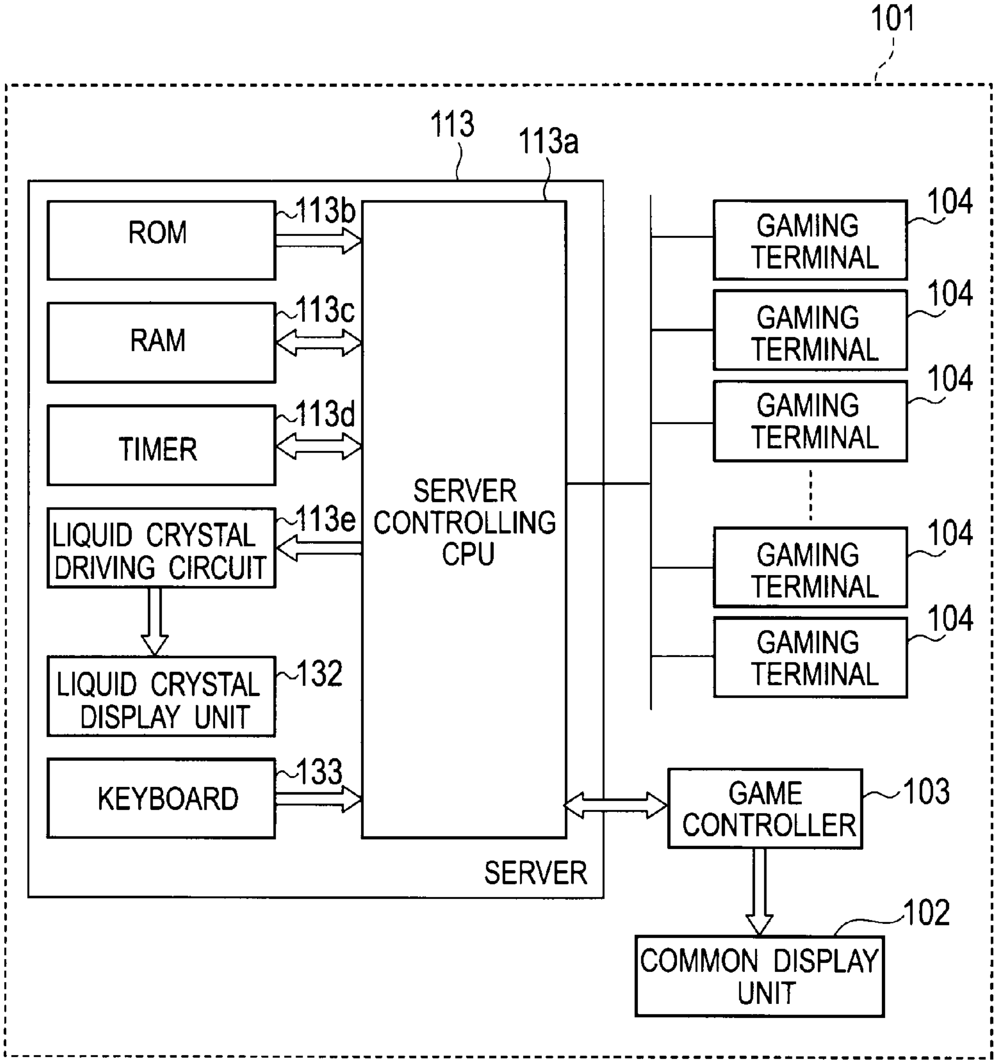
FIG. 11 is a block diagram showing an electrical configuration of the blackjack game system according to the first embodiment of the present invention.

FIG. 11 is a block diagram showing an electrical configuration of the blackjack game system 101 of this embodiment. As shown in FIG. 11, the blackjack game system 101 includes the server 113, the common display unit 102 connected to the server 113 through the game controller 103, and the multiple (nine in this embodiment) gaming terminals 104. Note that an internal configuration of the gaming terminal 104 will be described in detail later.

The server 113 includes a server controlling CPU **113*a* configured to execute overall control of the server 113, a ROM 113*b*, a RAM 113*c*, a timer 113*d*, a liquid crystal display unit 132 connected via a liquid crystal driving circuit 113*e*, and a keyboard 133**.

The server controlling CPU **113*a* performs a variety of processing based on inputted signals supplied from the gaming terminals 104, and on data and programs stored in the ROM 113*b* and the RAM 113*c* and transmits instruction signals to the gaming terminals 104 based on results of the processing, thereby initiatively controlling the gaming terminals 104. In particular, the server controlling CPU 113*a* transmits a control signal to the game controller 103 and thereby controls execution and display of the basic game on the common display unit 102**.

The ROM **113*b* is formed of a semiconductor memory, for example, and is configured to store a program for realizing a basic function of the blackjack game system 101, a program for executing notification of time for maintenance as well as setting and management of a condition for such notification, payout rates (the number of payout credits per medal upon winning) for the basic game and the side bet game, a program for initiatively controlling the gaming terminals 104**, and the like.

In the meantime, the RAM **113*c* temporarily stores information on the bet of chips supplied from the gaming terminals 104, wins and losses of the basic game executed and displayed on the common display unit 102, contents of winning in the side bet game, data concerning results of processing executed by the server controlling CPU 113*a***, and the like.

Further, the timer **113*d* configured to perform time measurement is connected to the server controlling CPU 113*a*. Time information of the timer 113*d* is transmitted to the server controlling CPU 113*a*. The server controlling CPU 113*a* controls the basic game as described later based on the time information from the timer 113*d***.

Figure 12:
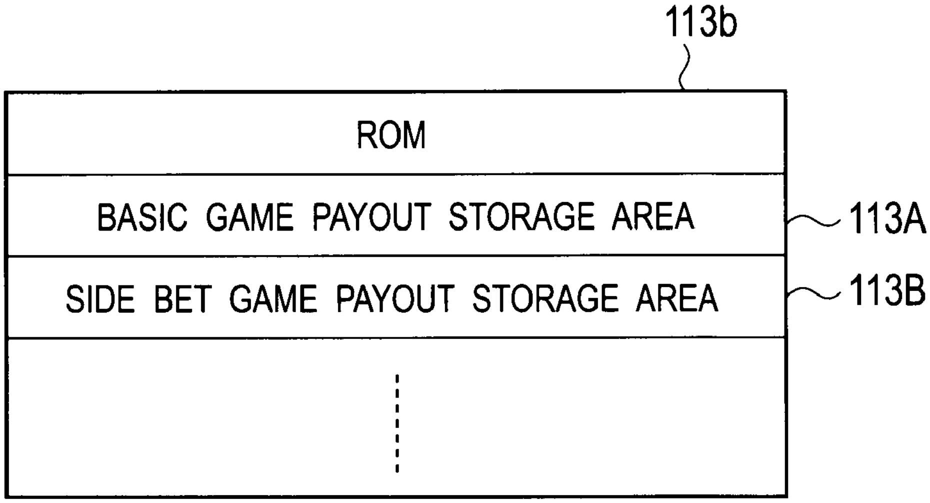
FIG. 12 is a schematic diagram showing storage areas in a ROM of a server provided in the blackjack game system in FIG. 6.

FIG. 12 is a schematic diagram showing storage areas in the ROM **113*b* of the server 113 in the blackjack game system 101 of this embodiment. As shown in FIG. 12, the ROM 113*b* is provided with a basic game payout storage area 113A storing the contents of the payout for the basic game shown on the list in FIG. 4, and a side bet game payout storage area 113B storing the contents of the payout for the side bet game shown on the list in FIG. 5**.

Accordingly, in this embodiment, the contents of the payout for the basic game shown on the list in FIG. 4, which are stored in the basic game storage area 113A of the ROM **113*b* of the server 113, correspond to the game rule for the main card game. Meanwhile, in this embodiment, the contents of the payout for the side bet game shown on the list in FIG. 5, which are stored in the side bet game storage area 113B of the ROM 113*b* of the server 113, correspond to the game rule for the auxiliary card game. Specifically, the ROM 113*b*** of the server constitutes a memory in this embodiment.

Figure 13:
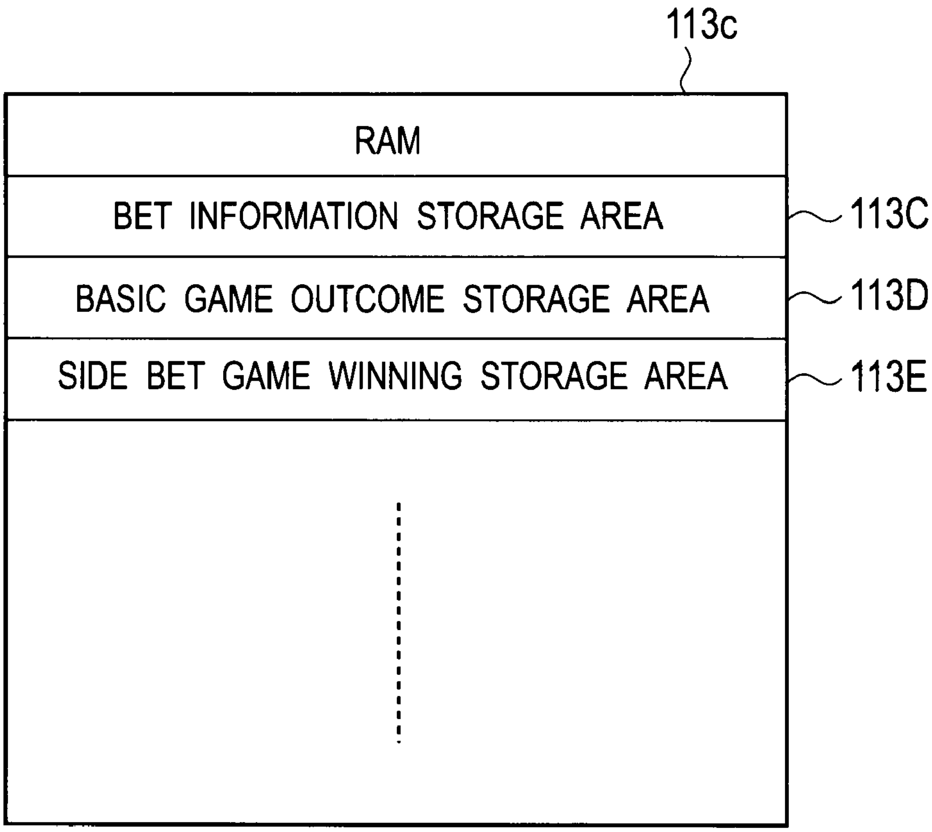
FIG. 13 is a schematic diagram showing storage areas in a RAM of the server provided in the blackjack game system in FIG. 6.

FIG. 13 is a schematic diagram showing storage areas in the RAM **113*c* of the server 113 in the blackjack game system 101 of this embodiment. As shown in FIG. 13, the ROM 113*c* is provided with a bet information storage area 113C storing bet information concerning the players who are currently playing games, a basic game outcome storage area 113D storing wins or losses of the basic game executed and displayed on the common display unit 102, and a side bet game winning storage area 113E storing the contents of winning in the side bet game. To be more precise, the bet information is the information on the game which is a betting target designated on the above-described BET screen 160 and on the bets made by using the gaming terminals 104** including the number of the chips (the number of bets) bet on the designated game and the like.

Figure 14:
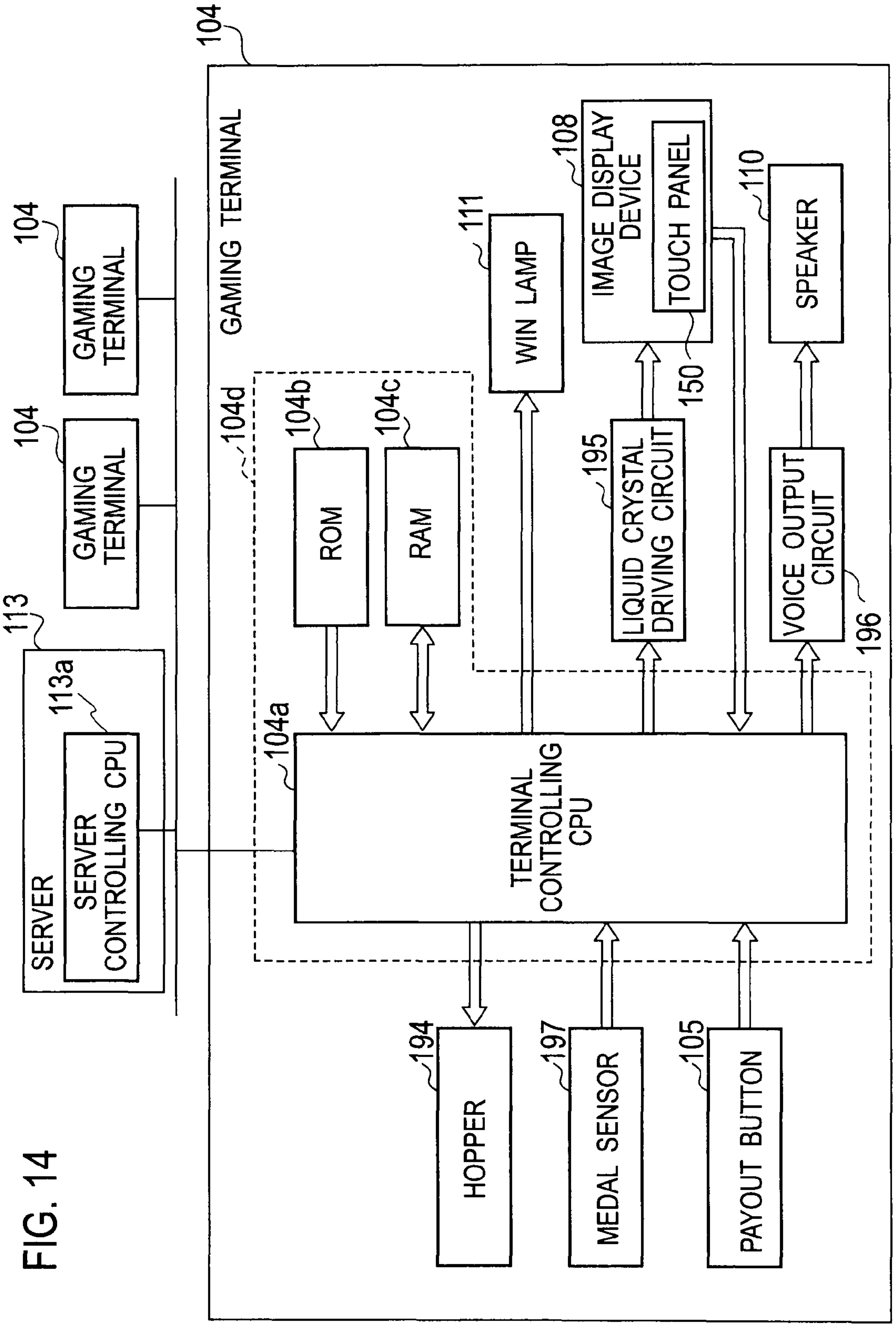
FIG. 14 is a block diagram showing an internal configuration of the gaming terminal according to the first embodiment of the present invention.

FIG. 14 is a block diagram showing the internal configuration of the gaming terminal of this embodiment. Note that the nine gaming terminals 104 provided herein basically have the same configuration. Accordingly, one of the gaming terminals 104 will be described below as an example.

As shown in FIG. 14, the gaming terminal 104 includes a terminal controller **104*d* provided with a terminal controlling CPU 104*a*, a ROM 104*b*, and a RAM 104*c*. The ROM 104*b* is formed of a semiconductor memory, for example, and is configured to store a program for realizing a basic function of the gaming terminal 104, various other programs required for controlling the gaming terminal 104, a data table, and the like. Meanwhile, the RAM 104***c* is a memory configured to temporarily store various data calculated by the terminal controlling CPU 104*a*, the number of credits currently owned by the player (reserved in the gaming terminal), a chip betting condition by the player, and the like.

The payout button 105 is connected to the terminal controlling CPU 104*a*. The payout button 105 is the button usually pressed by the player to terminate the game. When the payout button 105 is pressed by the player, the medals in the number corresponding to the credits (usually one medal for one credit) gained through the games and the like and currently owned by the player are discharged from the medal payout opening 112.

The terminal controlling CPU 104*a* performs control to execute various corresponding operations based on an operating signal outputted from the payout button 105 when the player presses the payout button 105. To be more precise, when a signal is inputted through a touch operation of the BET screen 160 by the player, the terminal controlling CPU 104*a* executes a variety of processing based on the input signal and on the data as well as the programs stored in the ROM 104*b* and the RAM 104*c*, and then transmits results of the processing to the server controlling CPU 113*a*.

Meanwhile, the terminal controlling CPU 104*a* receives an instruction signal from the server controlling CPU 113*a*, controls peripheral devices constituting the gaming terminal 104, and causes the gaming terminal 104 to proceed with the games. Moreover, depending on the contents of the processing, the terminal controlling CPU 104*a* executes a variety of processing based on the above-described inputted signal and the data as well as the programs stored in the ROM 104*b* and the RAM 104*c*, controls the peripheral devices constituting the gaming terminal 104 based on the results thereof, and causes the gaming terminal 104 to proceed with the games.

In the meantime, a hopper 194 is connected to the terminal controlling CPU 104*a*. The hopper 194 discharges a predetermined number of medals from the medal payout opening 112 (see FIG. 6) in response to an instruction signal from the terminal controlling CPU 104*a*.

Further, the display unit 108 is connected to the terminal controlling CPU 104*a* via a liquid crystal driving circuit 195. The liquid crystal driving circuit 195 includes a program ROM, an image ROM, an image control CPU, a work RAM, a VDP (video display processor), and a video RAM. The program ROM stores an image controlling program concerning the display on the display unit 108 and various selection tables. The image ROM stores dot data for forming images to be displayed on the display unit 108, for example. The image control CPU is configured to determine the image to be displayed on the display unit 108, which is selected from the dot data stored in advance in the image ROM, in accordance with the image controlling program stored in advance in the program ROM and based on a parameter set by the terminal controlling CPU 104*a*. The work RAM is formed as a temporary storage device to be used when the image control CPU executes the image controlling program. The VDP is configured to form the image corresponding to the contents of display determined by the image control CPU and outputs the image to the display unit 108. Here, the video RAM is formed as a temporary storage device to be used when the VDP forms the image.

Meanwhile, the touch panel 150 is attached to the front face of the display unit 108 as described above. Information concerning the operation of the touch panel 150 by the player is transmitted to the terminal controlling CPU 104*a*. The operation to bet the chips by the player on the BET screen 160 is executed by use of the touch panel 150. Specifically, the player operates the touch panel 150 when performing the operations to designate the player card area 162 and the side bet area 163, the operations of the REPEAT BET button 165, the DOUBLE BET BUTTON 166, and the ALL CANCEL button 167, and so forth. When the touch panel 150 is operated by the player, the information concerning the operation is transmitted to the terminal controlling CPU 104*a*. Then, the bet information of the current player (on the player card area 162 or the side bet area 163 corresponding to the games designated as the chip betting target on the BET screen 160 and the number of the chips bet thereon) is stored in the RAM 104*c* as appropriate based on the transmitted information. Further, the bet information is transmitted to the server controlling CPU 113*a* and stored in the bet information area of the RAM 113*c*.

In addition, a voice output circuit 196 and the speaker 110 are connected to the terminal controlling CPU 104*a*. The speaker 110 is configured to generate various sound effects when performing various effects based on outputted signals from the voice output circuit 196.

Moreover, a medal sensor 197 is connected to the terminal controlling CPU 104*a*. The medal sensor 197 detects the medals inserted from the medal insertion slot 107 (see FIG. 6), calculates the inserted medals, and transmits a result of calculation to the terminal controlling CPU 104*a*. The terminal controlling CPU 104*a* increases the number of credits owned by the player and stored in the RAM 104*c* based on the transmitted signal.

Furthermore, the WIN lamp 111 is connected to the terminal controlling CPU 104*a*. The terminal controlling CPU 104*a* lights the WIN lamp 111 on in a predetermined color upon winning of the bet made on the basic game or the side bet game using the BET screen 160.

Figure 15:
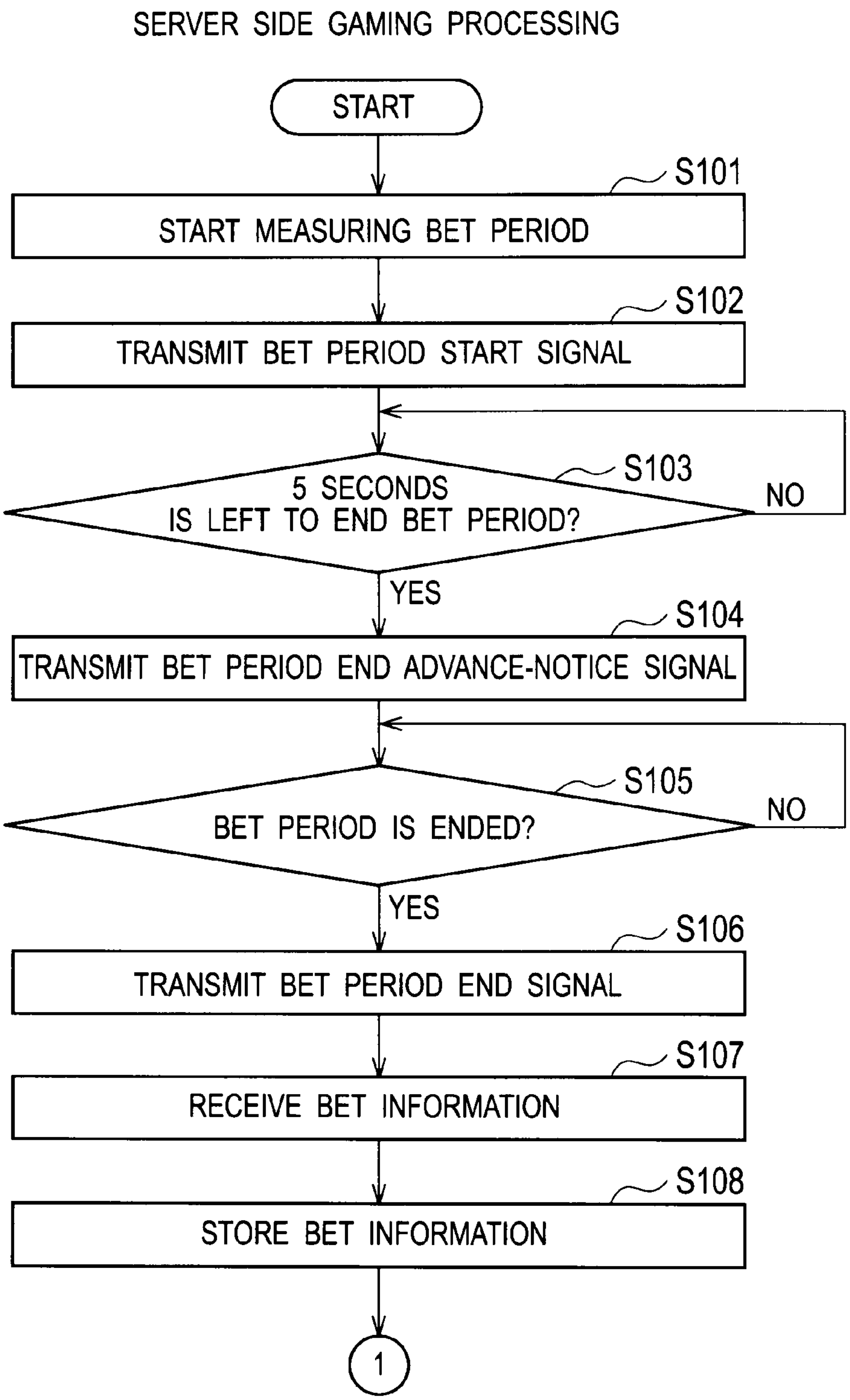
FIG. 15 is a flowchart showing gaming processing by the server in the blackjack game system according to the first embodiment of the present invention.
Figure 16:
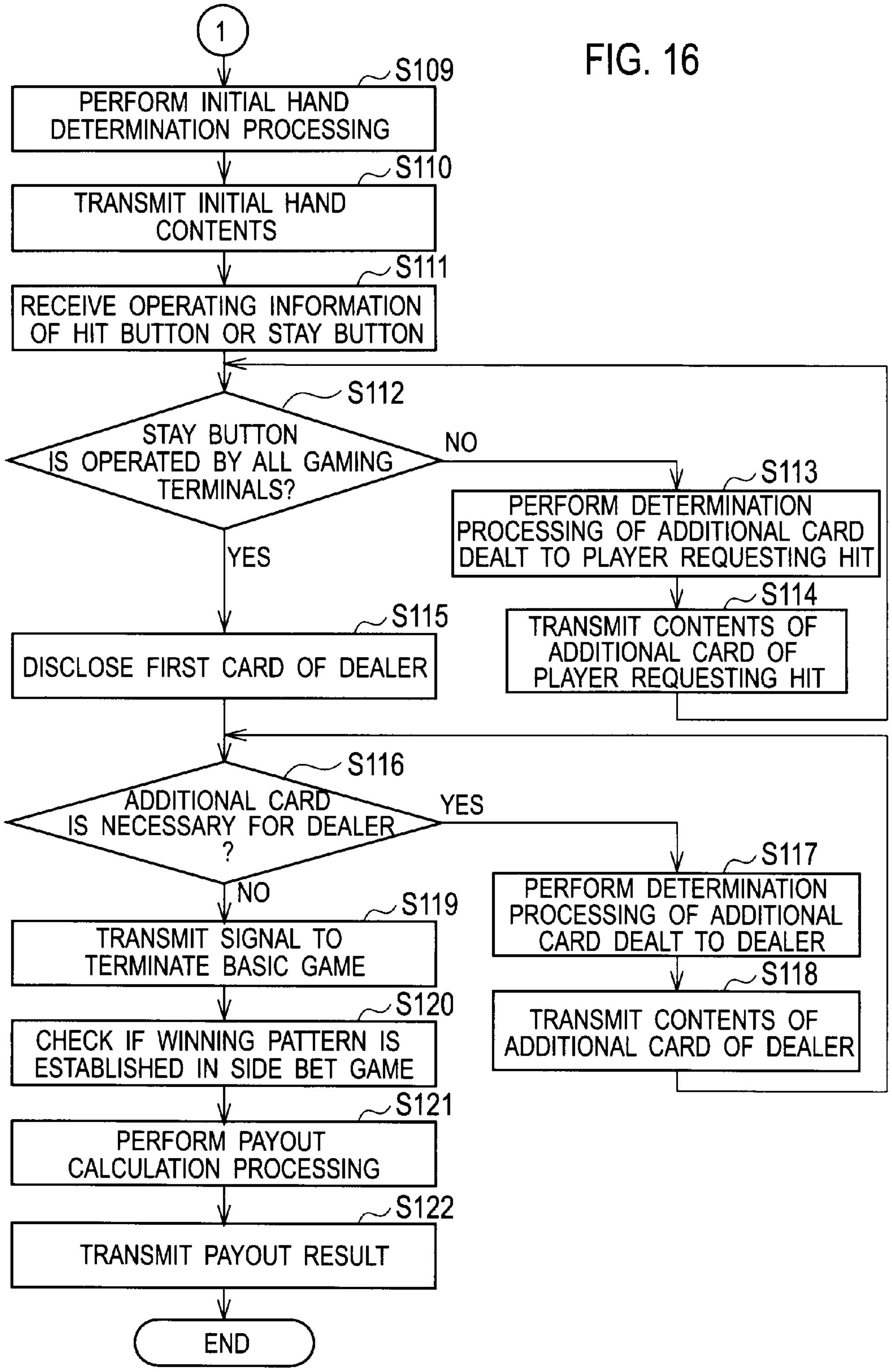
FIG. 16 is another flowchart showing the gaming processing by the server in the blackjack game system according to the first embodiment of the present invention.

Next, with reference to FIG. 15 and FIG. 16, description will be given of server side gaming processing which is executed by the server controlling CPU 113*a* of the server 113 in the blackjack game system 101 of this embodiment in accordance with the program stored in the ROM 113*b*. FIG. 15 and FIG. 16 are flowcharts which show gaming processing by the server in the blackjack game system of this embodiment.

The gaming processing on the server 113 side will be described based on FIG. 15 and FIG. 16 to begin with. First, as shown in FIG. 15, the server controlling CPU 113*a* starts time measurement of the bet period in step S101. The bet period is the period when the player can input the bet. The player participating in the game can bet his or her own chips on the basic game or the side bet game (on the player card area 162 or the side bet area 163 related thereto) by operating the touch panel 150 during this bet period. When the time measurement of the bet period is started, the server controlling CPU 113*a* transmits a bet period start signal indicating the start of the bet period to the terminal controlling CPU 104*a* (step S102).

Next, in step S103, the server controlling CPU 113*a* judges whether or not there are 5 seconds left to end the bet period. Note that the remaining bet period is displayed on the BET time indicator 171 on the display unit 108 of the gaming terminal 104 (see FIG. 8). When a judgment is made that there are more than 5 seconds left, the processing goes back to step S103. On the other hand, the processing goes to step S104 when a judgment is made that there are 5 seconds left.

In step S104, the server controlling CPU 113*a* transmits a bet period end advance-notice signal to give advance notice of an end of the bet period to the terminal controlling CPU 104*a* of each of the gaming terminals 104. Next, in step S105, the server controlling CPU 113*a* judges whether or not the bet period is ended. When a judgment is made that the bet period is not ended, the server controlling CPU 113*a* stands by until the end of the bet period. When a judgment is made that the bet period is ended, the server controlling CPU 113*a* transmits a bet period end signal indicating the end of the bet period to the terminal controlling CPU 104*a* of each of the gaming terminals 104 (step S106).

Next, in step S107, the server controlling CPU 113*a* receives the bet information (the player card area 162 or the side bet area 163 designated by the touch operation, the number of the chips bet on the designated player card area 162 or the designated side bet area 163 (the number of bets)) inputted by the player using each of the gaming terminals 104, and stores the bet information in the bet information storage area 113C of the RAM 113*c* (step S108).

Next, as shown in FIG. 16, the server controlling CPU 113*a* performs initial hand determination processing in step S109. In this processing, the server controlling CPU 113*a* determines the contents of two cards to be dealt to the dealer and two cards to be dealt to each player as initial hands using random values sampled by a sampling circuit or the like.

Next, in step S110, the server controlling CPU 113*a* transmits control signals to the CPU 103*a* of the game controller 103 and the terminal controlling CPU 104*a* of each of the gaming terminals 104 based on the processing in step S109, thereby notifying the game controller 103 and each of the gaming terminals 104 of the contents concerning initial hands of the dealer and the player, that is, the pairs of cards (note that a first card of the dealer is faced down while the rest of the cards are faced up) to be displayed on the common display unit 102 and the display unit 108 of each of the gaming terminals 104.

Next, in step S111, the server controlling CPU 113*a* receives operating information of the hit button 174 or the stay button 175 inputted by the player using each of the gaming terminals 104 from the terminal controlling CPU 104*a*. Then, the server controlling CPU 113*a* judges from the received operating information whether or not the stay button 175 is operated by all the gaming terminals 104 (step S112).

If there is any gaming terminal 104 where the stay button 175 is yet to be operated (NO in step S112), the server controlling CPU 113*a* determines an additional card (one card) to be dealt to the player in the basic game of blackjack corresponding to the gaming terminal 104 where the hit button 174 is operated (step S113).

Next, in step S114, the server controlling CPU 113*a* transmits control signals to the CPU 103*a* of the game controller 103 and the terminal controlling CPU 104*a* of each of the gaming terminals 104 based on the processing in step S113. Thereby, the server controlling CPU 113*a* notifies the game controller 103 and each of the gaming terminals 104 of the contents of the additional cards (which are faced up) of the players to be displayed on the common display unit 102 and the display unit 108 of each of the gaming terminals 104 where the hit button 174 is operated. Then, the processing goes to step S112.

Thereafter, when the stay button 175 is operated by all the gaming terminals 104 (YES in steps S112), the server controlling CPU 113*a* transmits control signals to the CPU 103*a* of the game controller 103 and the terminal controlling CPU 104*a* of each of the gaming terminals 104 in step S115, thereby facing up (disclosing) the first card of the dealer on the common display unit 102 and the display unit 108 of each of the gaming terminals 104.

Next, in step S116, the server controlling CPU 113*a* judges whether or not an additional card needs to be dealt to the dealer in the basic game of blackjack based on the contents of the dealer's initial hand (the two cards) determined in step S109.

When the score of the dealer's initial hand is below 16 and an additional card needs to be dealt to the dealer (YES in step S116), the server controlling CPU 113*a* determines the additional card (one card) to be dealt to the dealer in the basic game of blackjack (step S117).

Next, in step S118, the server controlling CPU 113*a* transmits control signals to the CPU 103*a* of the game controller 103 and the terminal controlling CPU 104*a* of each of the gaming terminals 104 based on the processing in step S117. Thereby, the server controlling CPU 113*a* notifies the game controller 103 and each gaming terminal 104 of the contents of the additional card (which is faced up) of the dealer to be displayed on the common display unit 102 and the display unit 108 of each gaming terminal 104. Then, the processing goes to step S116.

Thereafter, when the score of the dealer's hand becomes 17 or more and no more additional cards need to be dealt to the dealer (YES in step S116), the server controlling CPU 113*a* transmits control signals to the CPU 103*a* of the game controller 103 and the terminal controlling CPU 104*a* of each of the gaming terminals 104 based on the processing in step S117, thereby notifying the game controller 103 and each of the gaming terminals 104 of the end of the basic game. Then, the processing goes to step S120.

Next, in step S120, the server controlling CPU 113*a* checks the presence or absence of establishment of a winning pattern in each of the gaming terminals 104 making the bet on the side bet game, using the bet information received from each of the gaming terminals 104 in step S107 and the contents of the initial hand of the dealer and the player determined in step S109.

Next, in step S121, the server controlling CPU 113*a* performs payout calculation processing. In this payout calculation processing, an amount of payout to be provided to each of the gaming terminals 104 winning against the dealer in the basic game, and an amount of payout to be provided to each of the gaming terminals 104 establishing the winning pattern in the side bet game are calculated.

The payout calculation processing for the basic game is executed for each of the gaming terminals 104 winning against the dealer in the basic game by use of the payout rates (the number of payout credits per chip (for each bet)) as defined on the list in FIG. 4, which are stored in the basic game payout storage area 113A of the ROM 113*b*. The payout calculation processing for the side bet game is executed for each of the gaming terminals 104 establishing the winning pattern in the side bet game by use of the payout rates (the number of payout credits per chip (for each bet)) for the winning patterns as defined on the list in FIG. 5, which are stored in the side bet game payout storage area 113B of the ROM 113*b*.

Next, in step S122, the server controlling CPU 113*a* performs transmission processing of results of credit payouts provided in conjunction with the basic game and the side bet game based on the payout calculation processing in step S120. To be more precise, credit data corresponding to the amount of payout for the basic game are outputted to the terminal controlling CPU 104*a* of the gaming terminal 104 winning against the dealer in the basic game and to the controller controlling CPU 103*a* of the game controller 103. Meanwhile, credit data corresponding to the amount of payout for the side bet game are outputted to the terminal controlling CPU 104_a_ of the gaming terminal 104 establishing the winning pattern in the side bet game. This sub-routine is completed after the processing in step S122.

Figure 17:
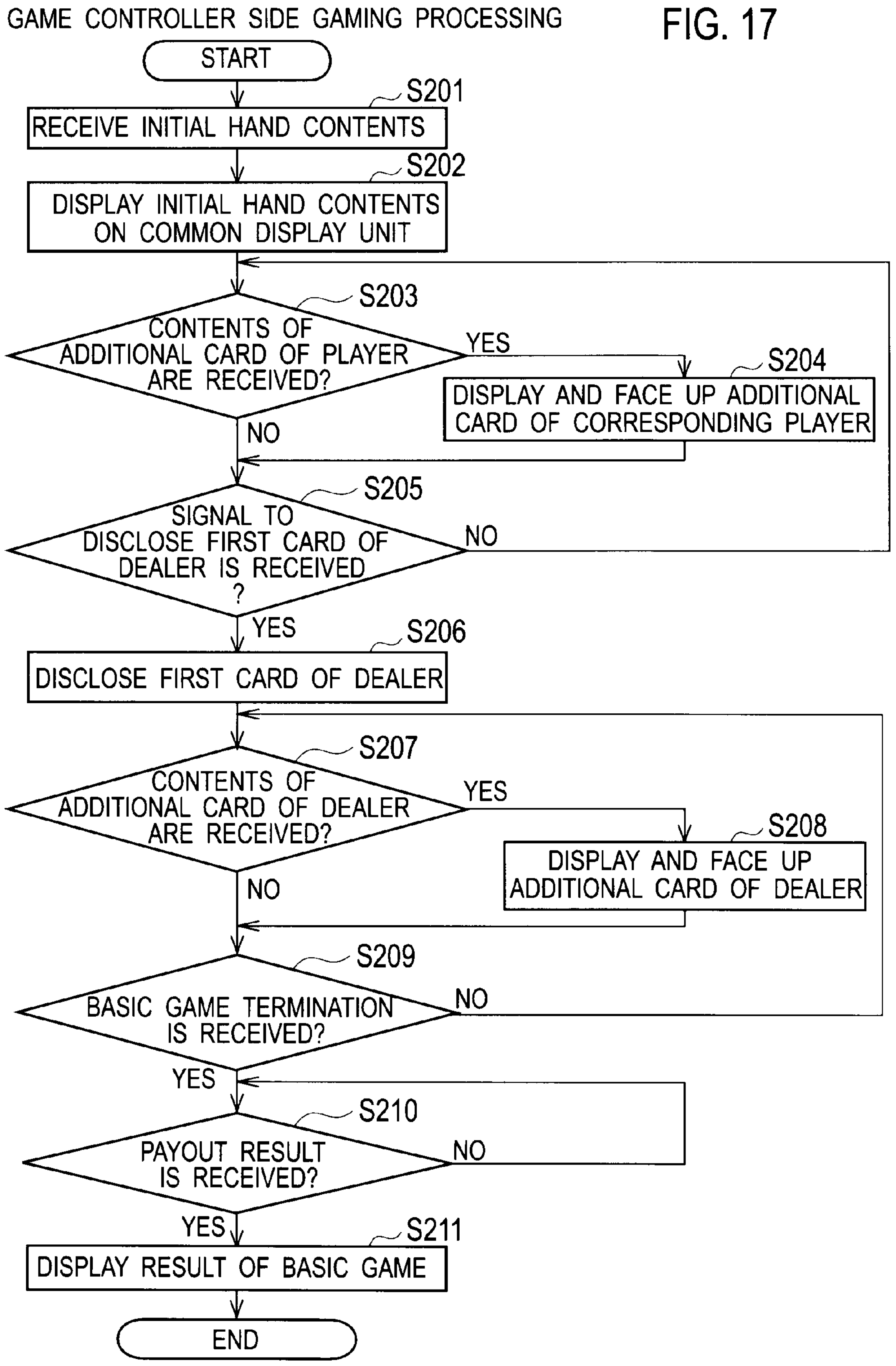
FIG. 17 is a flowchart showing gaming processing by the game controller in the blackjack game system according to the first embodiment of the present invention.

Next, with reference to FIG. 17, description will be given of game controller side gaming process executed in accordance with the program stored in the ROM 130_b_ by the controller controlling CPU 103_a_ of the game controller 103 in the blackjack game system 101 of this embodiment. FIG. 17 is a flowchart showing the game controller side gaming processing of the blackjack game system of this embodiment.

First of all, based on FIG. 17, the controller controlling CPU 103_a_ receives the control signal indicating the contents of the basic game to be displayed on the common display 102, which is transmitted from the server controlling CPU 113_a_ of the server 113 (step S201).

Next, in step S202, based on the control signal received from the server controlling CPU 113_a_ of the server 113, the controller controlling CPU 103_a_ causes the common display unit 102 to display the basic game having the contents notified by the control signal instead of the contents currently displayed thereon.

Next, in step S203, the controller controlling CPU 103_a_ checks whether or not the controller controlling CPU 103_a_ receives the control signal indicating the contents of the additional card of the player in the basic game of the blackjack corresponding to the gaming terminal 104 where the hit button 174 is operated. When no control signal is received (NO in step S203), the controller controlling CPU 103_a_ transfers the processing to step S205 to be described later.

Upon receipt of the control signal (YES in step S203), the controller controlling CPU 103_a_ additionally displays the card face-up (displayed and disclosed), the contents of which are indicated by the received control signal, on the common display unit 102, in the basic game of the corresponding player on the common display unit 102, in step S204. After the processing of this step S204, the controller controlling CPU 103_a_ transfers the processing to step S205.

Next, in step S205, the controller controlling CPU 103_a_ checks whether or not the controller controlling CPU 103_a_ receives the control signal indicating that the first card of the dealer should be turned face-up on the common display unit 102. If no control signal is received (NO in step S205), the controller controlling CPU 103_a_ transfers the processing to step S203.

Upon receipt of the control signal (YES in step S205), the controller controlling CPU 103_a_ turns the first card of the dealer face-up on the common display unit 102 in step S206. Then, in step S207, the controller controlling CPU 103_a_ checks whether or not the controller controlling CPU 103_a_ receives the control signal indicating the contents of the additional card of the dealer. If no control signal is received (NO in step S207), the controller controlling CPU 103_a_ transfers the processing to step S209 to be described later.

Upon receipt of the control signal (YES in step S207), the controller controlling CPU 103_a_ additionally displays the card face-up (displayed and disclosed), the contents of which are indicated by the received control signal, on the common display unit 102, in the basic game of the dealer on the common display unit 102, in step S208. After the processing of this step S208, the controller controlling CPU 103_a_ transfers the processing to step S209.

Next, in step S209, the controller controlling CPU 103_a_ checks whether or not the controller controlling CPU 103_a_ receives the control signal indicating the end of the basic game. If no control signal is received (NO in step S209), the controller controlling CPU 103_a_ transfers the processing to step S207. Upon receipt of the control signal (YES in step S209), the controller controlling CPU 103_a_ checks whether or not the controller controlling CPU 103_a_ receives the payout result of credits transmitted from the server controlling CPU 113_a_ (step S210). The controller controlling CPU 103_a_ repeats step S210 if no payout result of credits is received (NO in step S210).

On the other hand, upon receipt of payout result of credits (YES in step S210), the controller controlling CPU 103_a_ displays the outcome of the basic game on the common display unit 102 in step S211 based on the payout result received in step S210. Then, this sub-routine is completed.

Next, with reference to FIG. 18 to FIG. 22, description will be given of processing executed in accordance with the program stored in the ROM 104_b_ by the terminal controlling CPU 104_c_ of the gaming terminal 104 in the blackjack game system 101 of this embodiment. FIG. 18 to FIG. 22 are flowcharts which show gaming processing by the gaming terminal in the blackjack game system of this embodiment.

Here, a flag F in the RAM 104_c_ is assumed to be set to a default value "1" which indicates somewhere in the betting period. Moreover, the BET screen 160 shown in FIG. 8 is assumed to be displayed on the display unit 108 of the gaming terminal 104. In this state, as shown in FIG. 18, the terminal controlling CPU 104_a_ firstly performs bet period checking processing in step S301 and then performs bet acceptance processing in step S302.

Figure 19:
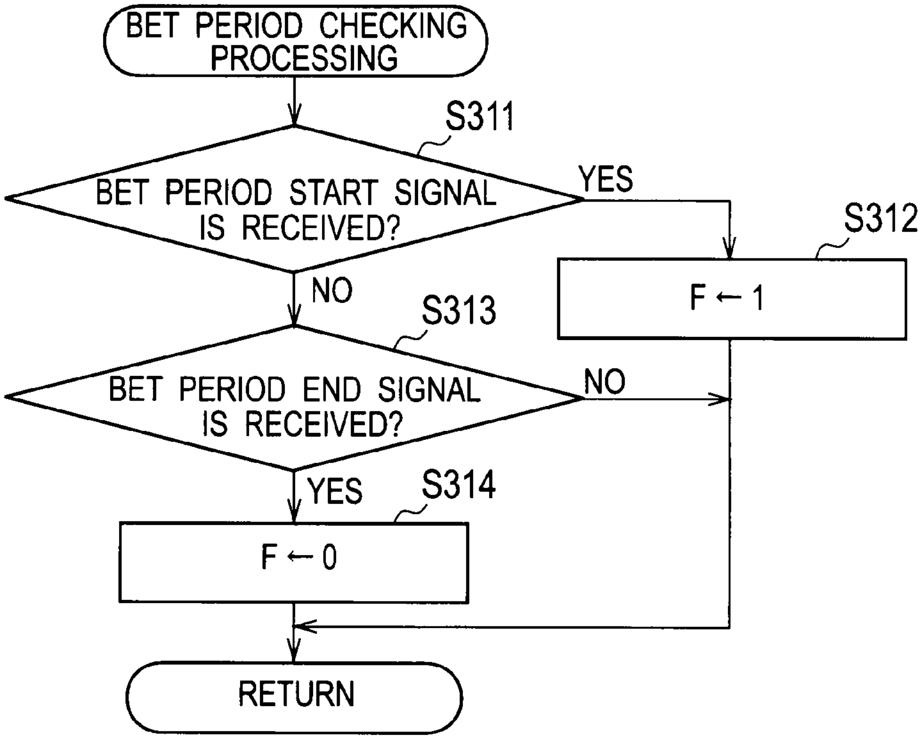
FIG. 19 is a flowchart showing bet period checking processing in FIG. 18.

Moreover, in the bet period checking processing in step S301, the terminal controlling CPU 104_a_ checks whether or not the terminal controlling CPU 104_a_ receives the bet period start signal from the server controlling CPU 113_a_ in step S311, as shown in FIG. 19. When the signal is received (YES in step S311), the terminal controlling CPU 104_a_ sets the flag F of the RAM 104_c_ which indicates somewhere in the bet period to the value "1" (step S312), and completes the bet period checking processing.

On the other hand, when no bet period start signal is received (NO in step S311), the terminal controlling CPU 104_a_ checks whether or not the terminal controlling CPU 104_a_ receives the bet period end signal from the server controlling CPU 113_a_ in step S313. When the signal is received (YES in step S313), the terminal controlling CPU 104_a_ sets the flag F of the RAM 104_c_ which indicates somewhere in the bet period to a value "0" (step S314), and completes the bet period checking processing. When no bet period end signal is received (NO in step S313), the terminal controlling CPU 104_a_ completes the bet period checking processing.

Figure 18:
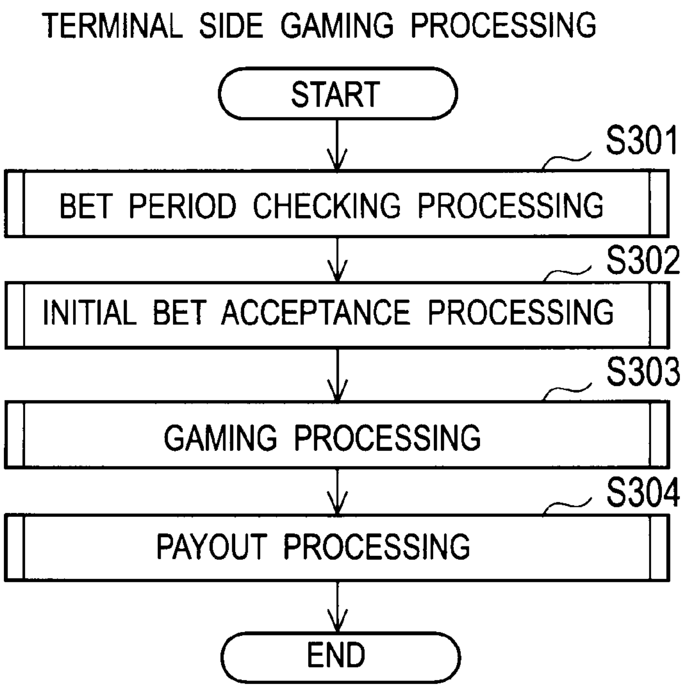
FIG. 18 is a flowchart showing gaming processing by the gaming terminal in the blackjack game system according to the first embodiment of the present invention.
Figure 20:
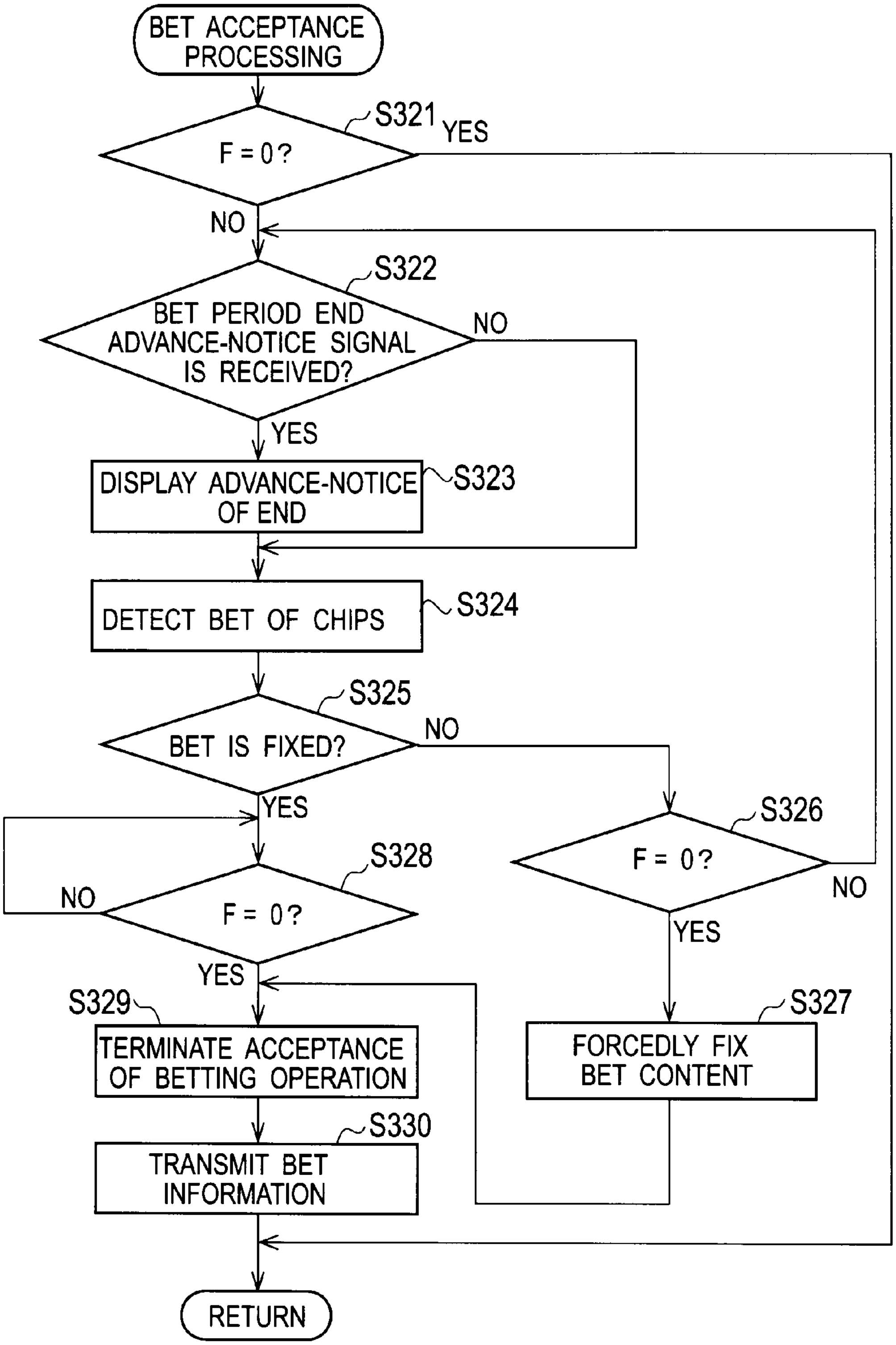
FIG. 20 is a flowchart showing bet acceptance processing in FIG. 18.

Next, in the bet acceptance processing in step S302 of FIG. 18, the terminal controlling CPU 104_a_ checks whether or not the flag F in the RAM 104_c_ is set to the value "0" in step S321, as shown in FIG. 20. The terminal controlling CPU 104_a_ terminates the bet acceptance processing if the flag F is set to the value "0". (YES in step S321).

On the other hand, when the flag F in the RAM 104_c_ is not set to the value "0" (NO in step S321), the terminal controlling CPU 104_a_ checks whether or not the terminal controlling CPU 104_a_ receives the bet period end advance-notice signal from the server controlling CPU 113_a_ in step S322. Upon receipt of the signal (YES in step S322), the terminal controlling CPU 104_a_ displays a message such as "HURRY UP! THE BET TIME ENDING SOON." which gives advance notice of the end of the bet period on the BET screen 160 shown in FIG. 8 (step S323), and then the processing goes to step S324 to be described later. On the other hand, the processing goes to step S324 if the remaining time of the bet period is not reduced to 5 seconds yet (6 seconds or more left) (NO in step S322).

In step S324, the terminal controlling CPU 104*a* detects the bet made by the player. Detection of the bet of chips is carried out in such a way that the touch panel 150 detects the player's action such as the pressing of the player card area 162 or the side bet area 163 or the pressing of the chips in stock in the chip box area 164 on the BET screen 160. When the bet of chips is detected, the chip mark 173 is displayed in the designated player card area 162 or designated the side bet area 163 on the display unit 108 according to the number of chips for the bet.

Next, in step S325, the terminal controlling CPU 104*a* checks whether or not the bet of chips by the player is fixed. Fixation of the bet is checked by detecting the end of the bet period.

Upon checking that the bet of chips by the player is not fixed yet (NO in step S325), the terminal controlling CPU 104*a* checks whether or not the flag F in the RAM 104*c* is set to the value "0" in step S326. The processing returns to step S322 if the flag F is not set to the value "0" (NO in step S326).

On the other hand, when the flag F is set to the value "0" (YES in step S326), the terminal controlling CPU 104*a* fixes the contents of the bet of chips detected in step S324 at that point (step S327). Thereafter, the terminal controlling CPU 104*a* proceeds to step S329.

Meanwhile, upon checking that the bet of chips by the player is fixed in steps S325 (YES), the terminal controlling CPU 104*a* checks whether or not the flag F in the RAM 104*c* is set to the value "0" in step S328. The terminal controlling CPU 104*a* repeats step S328 if the flag F is not set to the value "0" (NO in step S328). On the other hand, the processing goes to step S329 when the flag F in the RAM 104*c* is set to the value "0" (YES in step S328).

When the contents of the bet of chips detected at that point are forcibly fixed in step S327 or when the flag F in the RAM 104*c* is set to the value "0" in step S328 (YES), the terminal controlling CPU 104*a* terminates acceptance of the betting operation, using the touch panel 150 (step S329). Thereafter, the terminal controlling CPU 104*a* transmits the bet information (either the designated player card area 162 or the designated side bet area 163, and the number of chips (the number of bets) made on either the designated player card area 162 or the designated side bet area 163) inputted by the player using the gaming terminal 104 to the server controlling CPU 113*a* (step S330). Then, the terminal controlling CPU 104*a* completes the bet acceptance processing.

Figure 21:
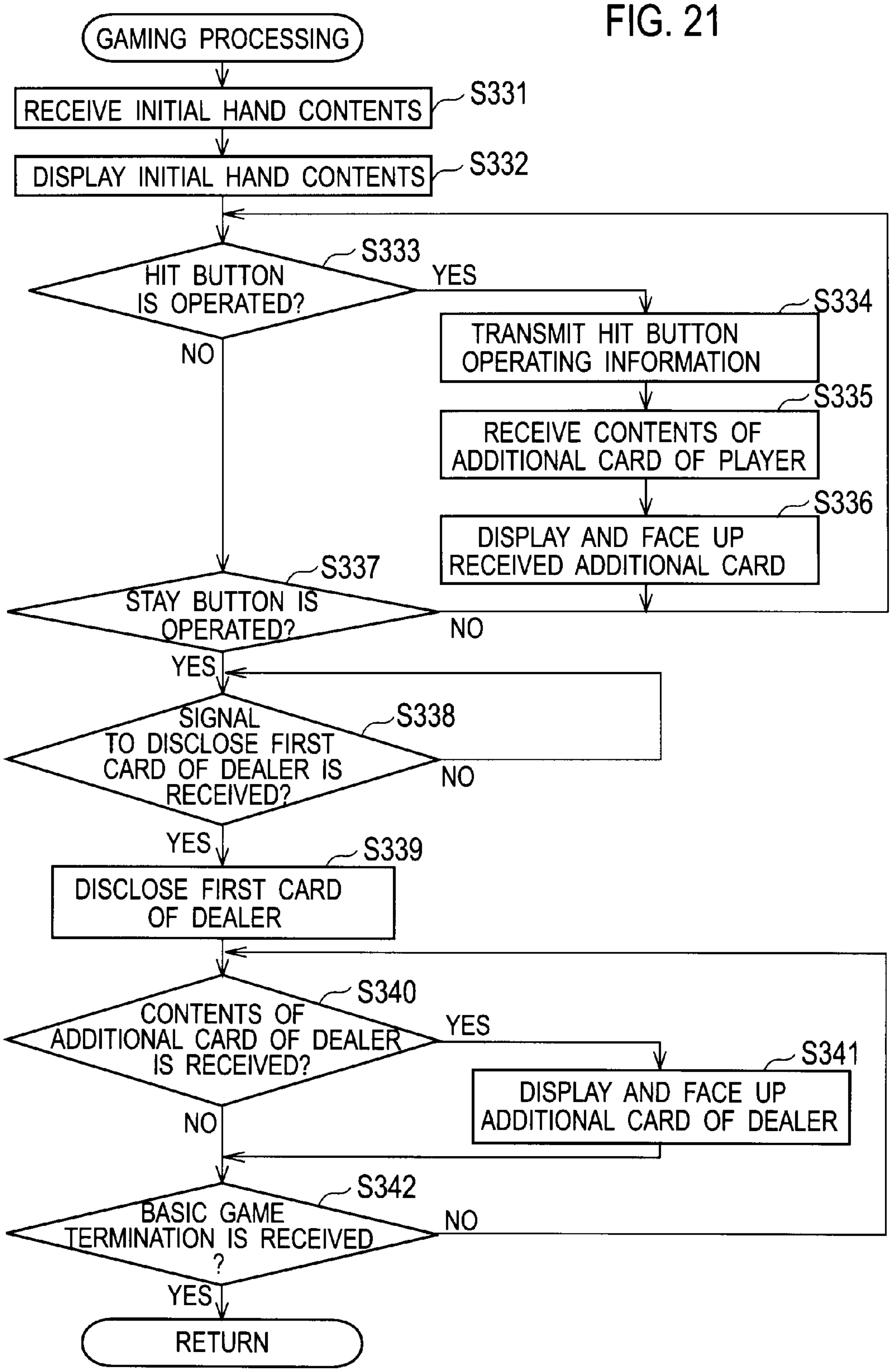
FIG. 21 is a flowchart showing processing during the game in FIG. 18.

Next, in processing during the game in step S303 of FIG. 18, as shown in FIG. 21, the terminal controlling CPU 104*a* receives the control signal indicating the contents of the basic game to be displayed on the display unit of the gaming terminal 104, which is transmitted from the server controlling CPU 113*a* of the server 113 (step S331).

Next, in step S332, the terminal controlling CPU 104*a* causes the display unit 108 of the gaming terminal 104 to display the basic game, in accordance with the contents notified by the control signal instead of the contents currently displayed on the display unit 108, based on the control signal received from the server controlling CPU 113*a* of the server 113.

Subsequently, in step S333, the terminal controlling CPU 104*a* checks whether or not a request for the additional card is made by the player. The request for the additional card made by the player is checked in such a way that the touch panel 150 detects the player's pressing of the hit button 174 on the BET screen 160.

Upon checking that the request for the additional card is made by the player (YES in step S333), the operating information of the hit button 174 inputted by the player is transmitted to the server controlling CPU 113*a* (step S334). Thereafter, the terminal controlling CPU 104*a* receives the control signal indicating the contents of the additional card of the player (which is faced up) from the server controlling CPU 113*a* (step S335). Then, the additional card, which has the contents indicated by the received control signal, is additionally displayed face-up in the player card area 162 on the BET screen 160 (step S336). Thereafter, the terminal controlling CPU 104*a* transfers the processing to step S333.

Upon checking that no request for the additional card is made by the player (NO in step S333), the terminal controlling CPU 104*a* checks whether or not the stay button 175 is operated by the player in step S337 as shown in FIG. 21. The operation of the stay button 175 is checked in such a way that the touch panel 150 detects the player's pressing of the stay button 175 on the BET screen 160.

The terminal controlling CPU 104*a* transfers the processing to step S333 upon checking that the stay button 175 is not operated by the player (NO in step S337). On the other hand, upon checking that the stay button 175 is operated by the player (YES in step S337), the terminal controlling CPU 104*a* checks whether or not the terminal controlling CPU 104*a* receives the control signal indicating that the first card of the dealer should be turned face-up on the BET screen 160 in step S338. If no control signal is received (NO in step S338), the terminal controlling CPU 104*a* repeats the processing in step S338.

Upon receipt of the control signal (YES in step S338), the terminal controlling CPU 104*a* turns the first card of the dealer face-up in the dealer card area 161 on the BET screen 160 in step S339. Then, in step S340, the terminal controlling CPU 104*a* checks whether or not the terminal controlling CPU 104*a* receives the control signal indicating the contents of the additional card of the dealer. If no control signal is received (NO in step S340), the terminal controlling CPU 104*a* transfers the processing to step S342 to be described later.

Upon receipt of the control signal (YES in step S340), the terminal controlling CPU 104*a* additionally displays the card face-up (displayed and disclosed), the contents of which are indicated by the received control signal, on the dealer card area 161, in the basic game of the dealer on the BET screen 160, in step S341. After the processing of this step S341, the terminal controlling CPU 104*a* transfers the processing to step S342.

Next, in step S342, the terminal controlling CPU 104*a* checks whether or not the terminal controlling CPU 104*a* receives the control signal indicating the end of the basic game. If no control signal is received (NO in step S342), the terminal controlling CPU 104*a* transfers the processing to step S340. This sub-routine is completed upon receipt of the control signal (YES in step S342).

When the player performs double down, split, and the like in the basic game of blackjack, control of the terminal controlling CPU 104*a* concerning an additional bet of chips on the basic game (on the player card area 162) is performed in this processing during the game (step S303). However, this processing is not important for the description of the embodiment of the present invention. Hence the detailed description thereof will be omitted herein.

Figure 22:
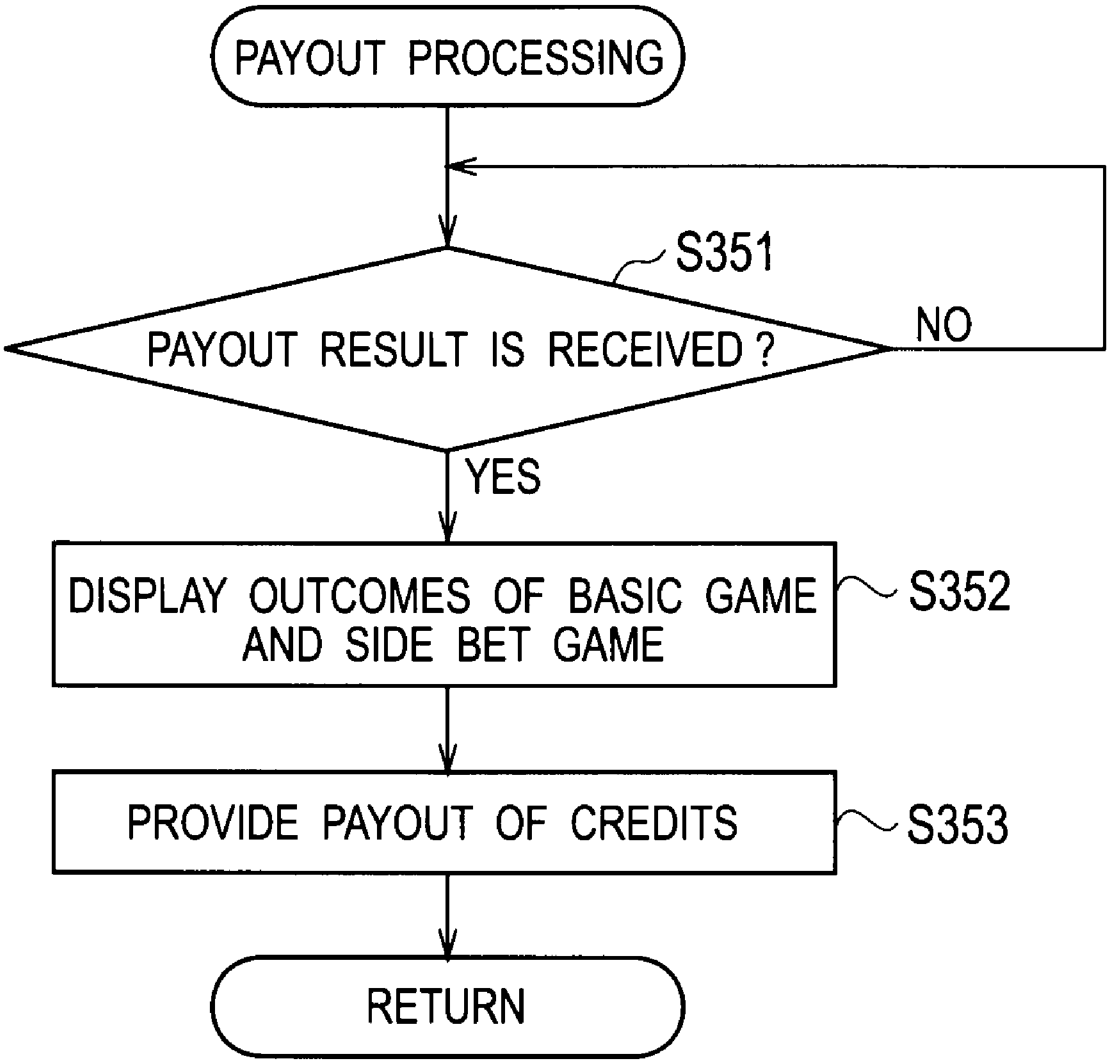
FIG. 22 is a flowchart showing payout processing in FIG. 18.

Next, in payout processing in step S304 of FIG. 18, the terminal controlling CPU 104*a* checks whether or not the terminal controlling CPU 104*a* receives the payout result of credits which is transmitted from the server controlling CPU 113*a* as shown in FIG. 22 (step S351). The terminal controlling CPU 104*a* repeats step S351 if no result is received (NO in step S351).

On the other hand, upon receipt of payout result of credits (YES in step S351), the terminal controlling CPU 104*a* displays the outcomes of the basic game and the side bet games on the BET screen 160 of the gaming terminal 104 in step S352, based on the payout result received in step S351.

Next, the terminal controlling CPU 104*a* provides a payout of credits in step S353, based on the payout result received in step S351. To be more precise, the terminal controlling CPU 104*a* stores credit data in an amount corresponding to the payout of the game in the RAM 104*c*. Then, when the payout button 105 is pressed, the medals corresponding to the amount of credits (usually one medal for one credit) currently stored in the RAM 104*c* are discharged from the medal payout opening 112. Thereafter, the terminal controlling CPU 104*a* completes the bet acceptance processing.

As it is apparent from the above description, in the blackjack game system 101 according to the first embodiment, the terminal controlling CPU 104*a* corresponds to the controller of the present invention.

Next, operations of the blackjack game system 101 according to the first embodiment of the present invention having the above-described configuration will be described with reference to FIG. 23 to FIG. 32.

Figure 23:
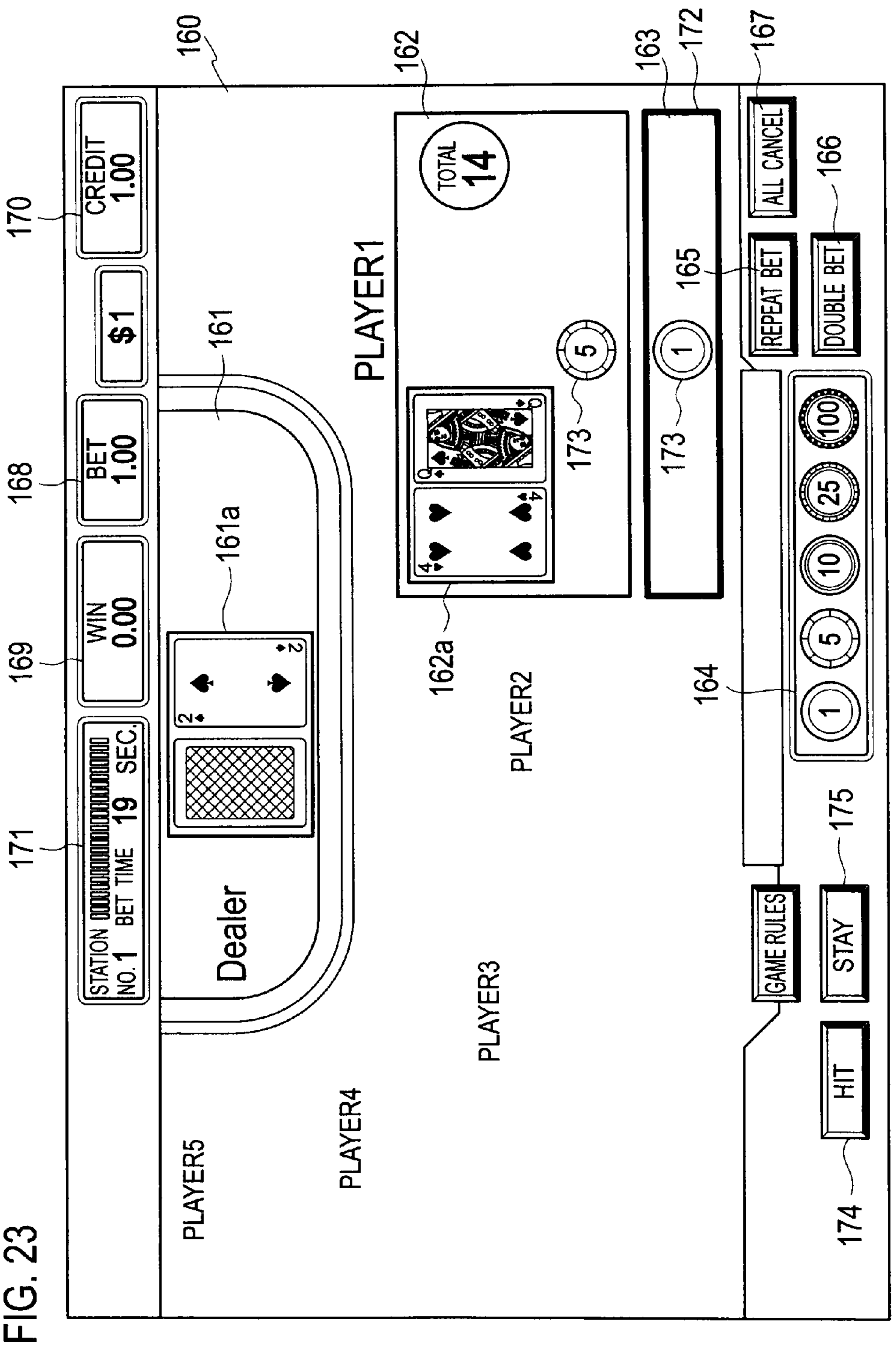
FIG. 23 is a view showing an example of an image to be displayed on the display unit provided on the gaming terminal in FIG. 7.

First, when the time allowable for betting the chips on the basic game and the side bet game is over, two cards are displayed in each of the dealer card area 161 and the player card area 162 on the BET screen 160 of each of the gaming terminals 104 as shown in FIG. 23. The first card of the dealer is faced down and all the rest of the cards are faced up. Then, first and second frames 161*a* and 162*a* are displayed so as to surround the first and second cards of the dealer and the player, respectively. These frames 161*a* and 162*a* are configured to indicate that the surrounded cards are target cards used for the side bet game.

Figure 24:
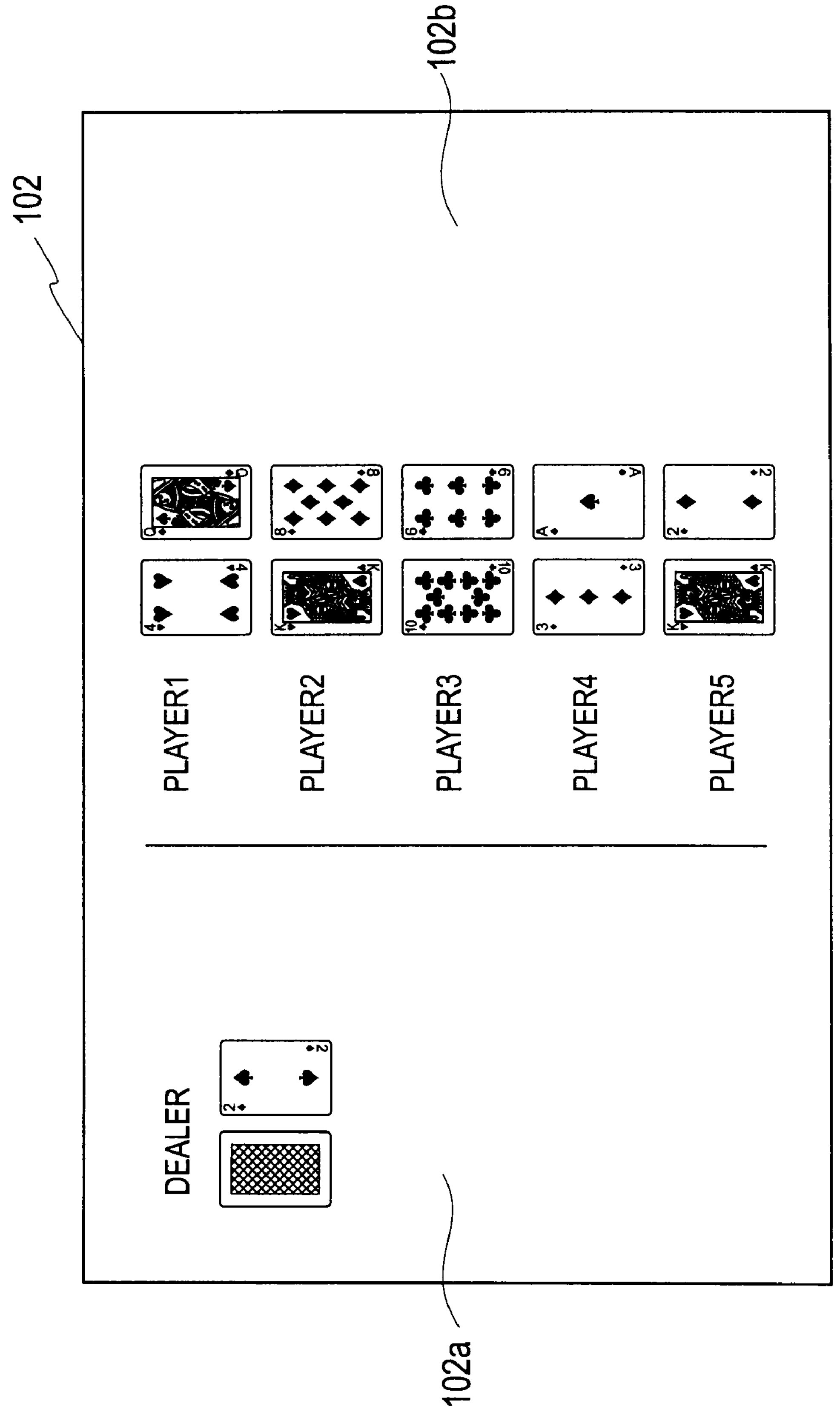
FIG. 24 is a view showing a display example of the basic game of blackjack to be displayed on the common display unit in FIG. 6.

At the same time, as shown in FIG. 24, the first and second cards of the dealer are displayed in the dealer card area 102*a* on the common display unit 102, and the first and second cards of the players displayed on the BET screens 160 of the gaming terminals 104 are displayed in the player card area 102*b* on the common display unit 102. All these cards are displayed so as to be faced up (whereas only the first card of the dealer is faced down).

Figure 25:
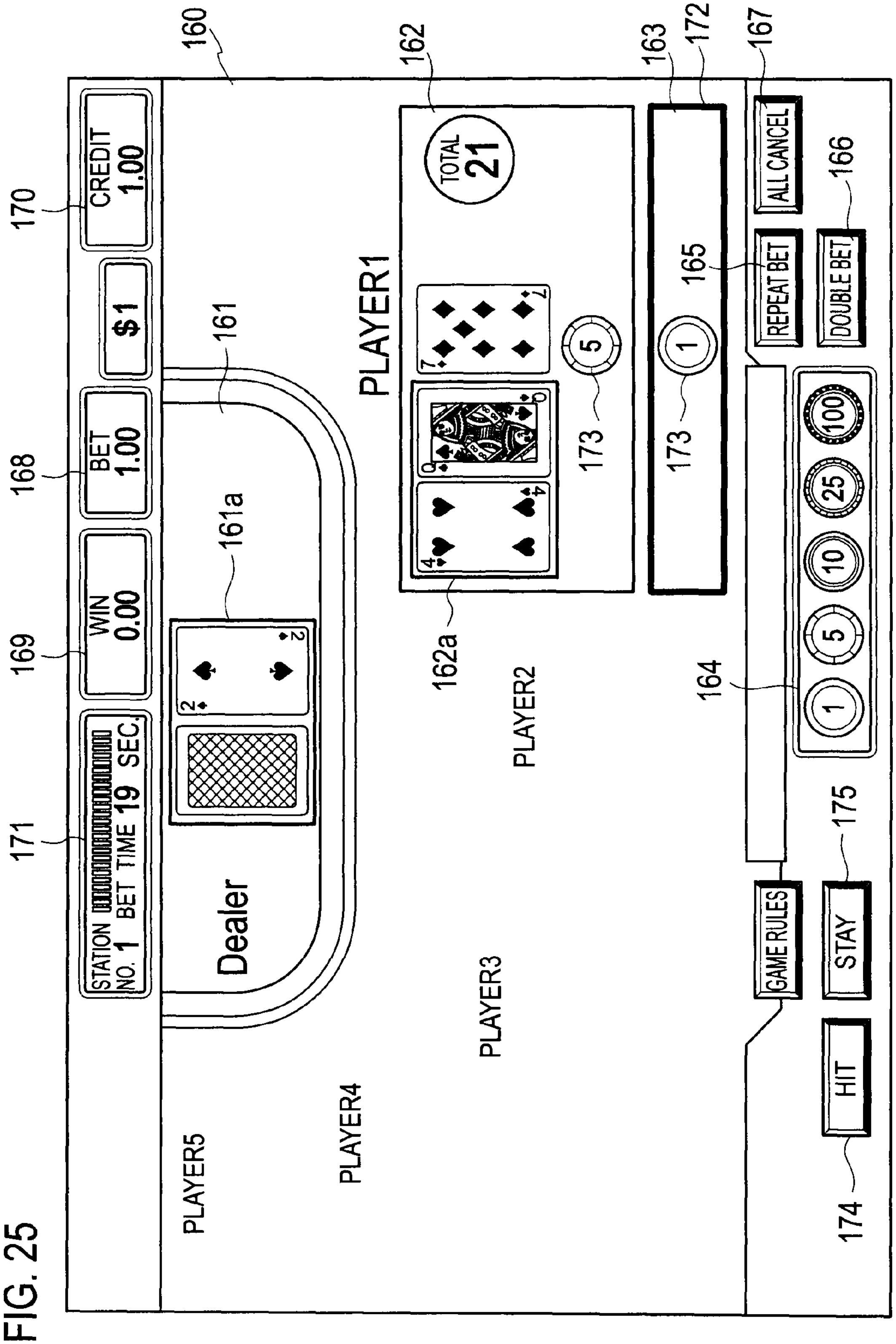
FIG. 25 is a view showing an example of an image to be displayed on the display unit provided on the gaming terminal in FIG. 7.
Figure 26:
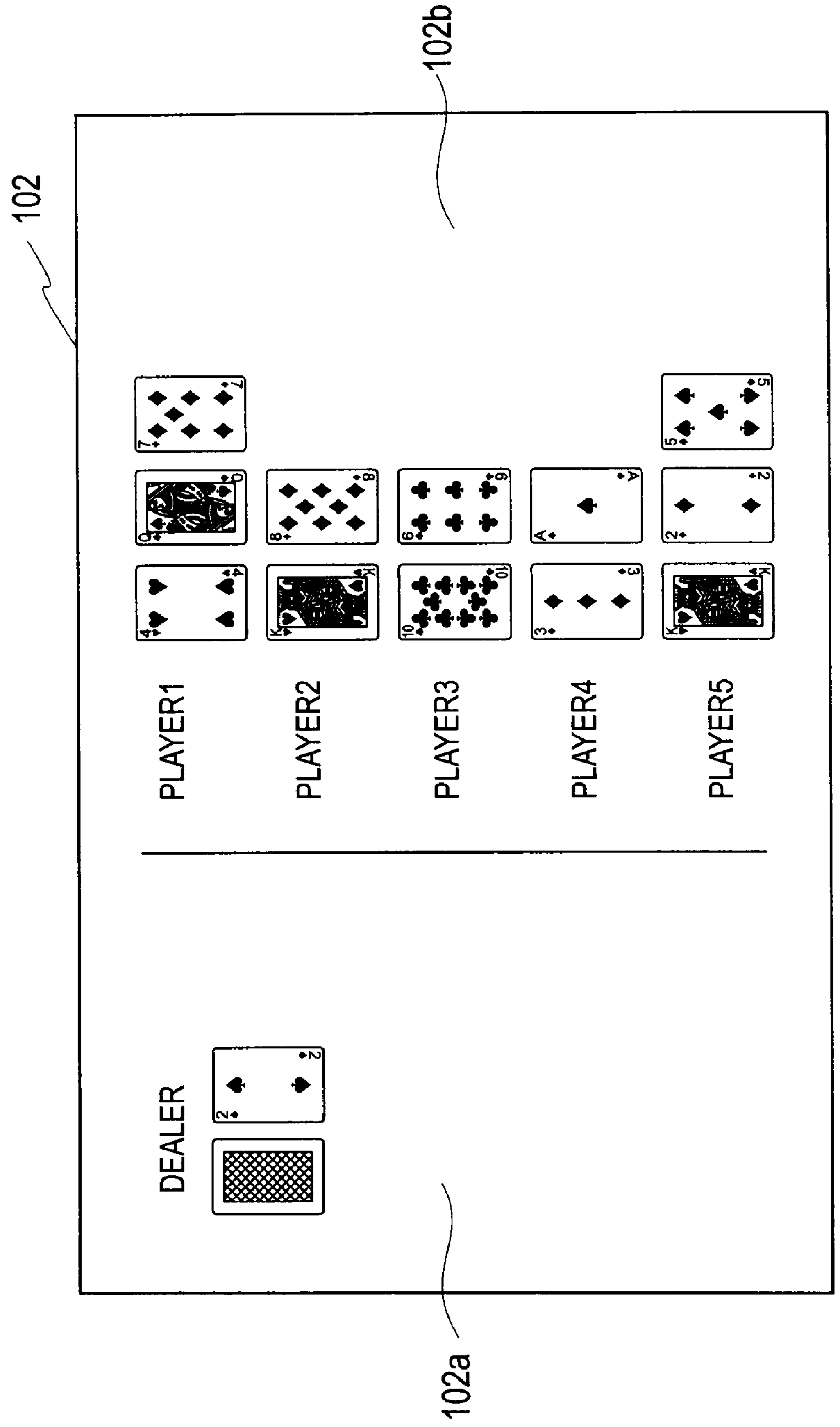
FIG. 26 is a view showing a display example of the basic game of blackjack to be displayed on the common display unit in FIG. 6.

Thereafter, during the period before all the players of the gaming terminals 104 fix the hands by operating the stay button 175, the additional card of the player is displayed face-up outside the frame 162*a* in the player card area 162 on the BET screen 160 of the gaming terminal 104 as shown in FIG. 25 every time the player operates the hit button 174. At the same time, as shown in FIG. 26, the additional cards of the players operating the hit button 174 are also displayed face-up in the player card area 102*b* on the common display unit 102 correspondingly to the gaming terminals 104.

Figure 27:
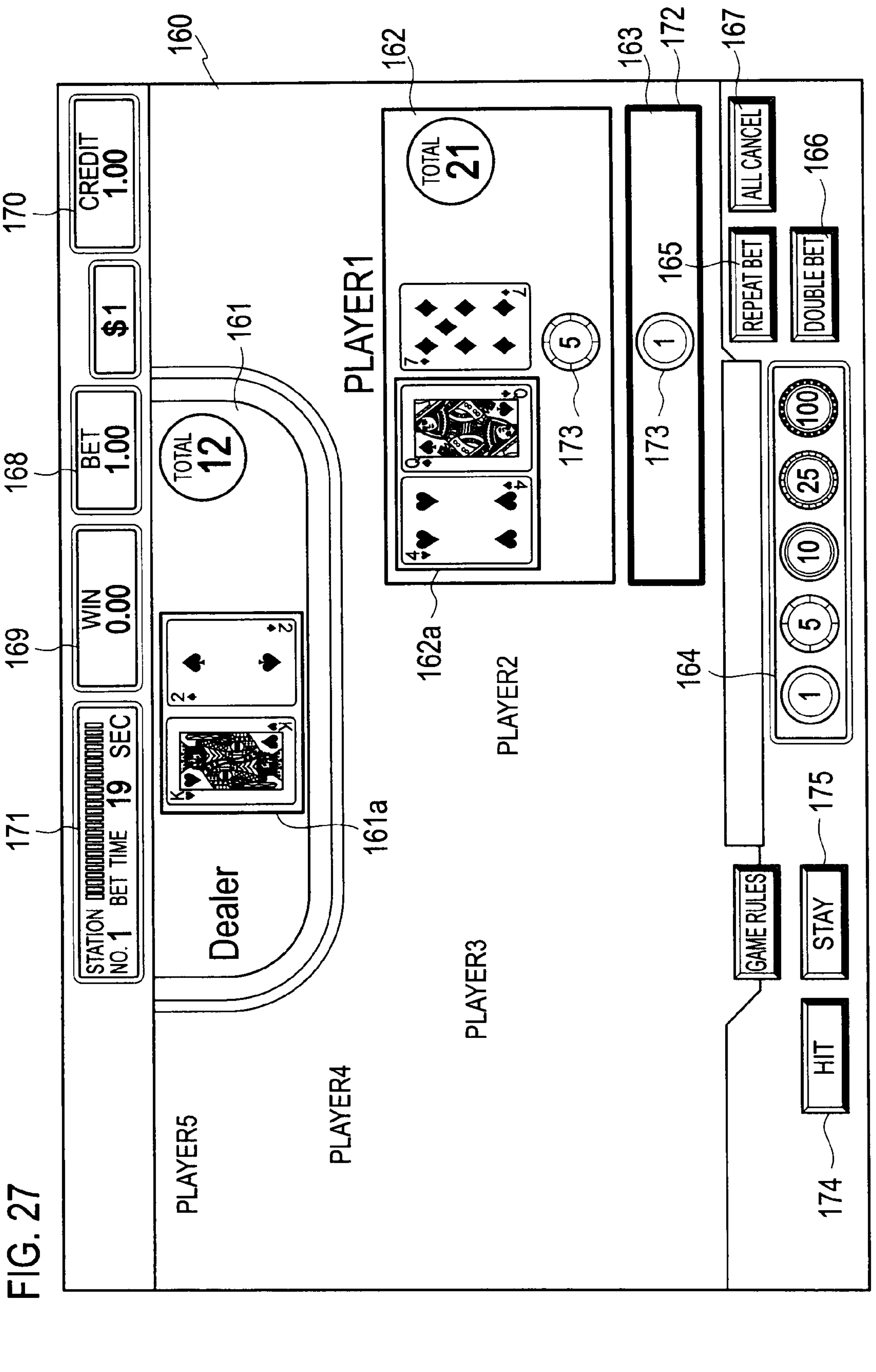
FIG. 27 is a view showing an example of an image to be displayed on the display unit provided on the gaming terminal in FIG. 7.
Figure 28:
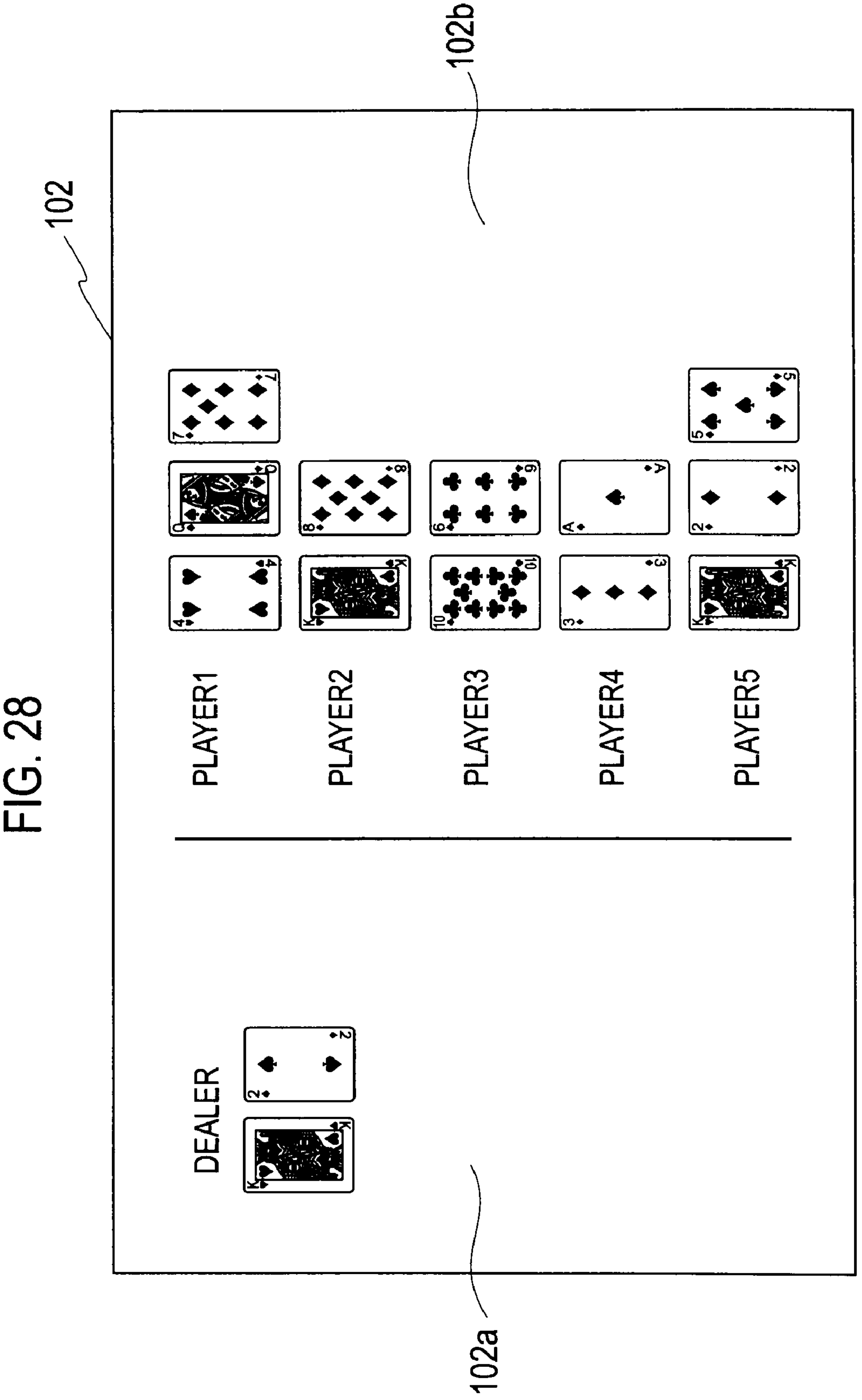
FIG. 28 is a view showing a display example of the basic game of blackjack to be displayed on the common display unit in FIG. 6.
Figure 29:
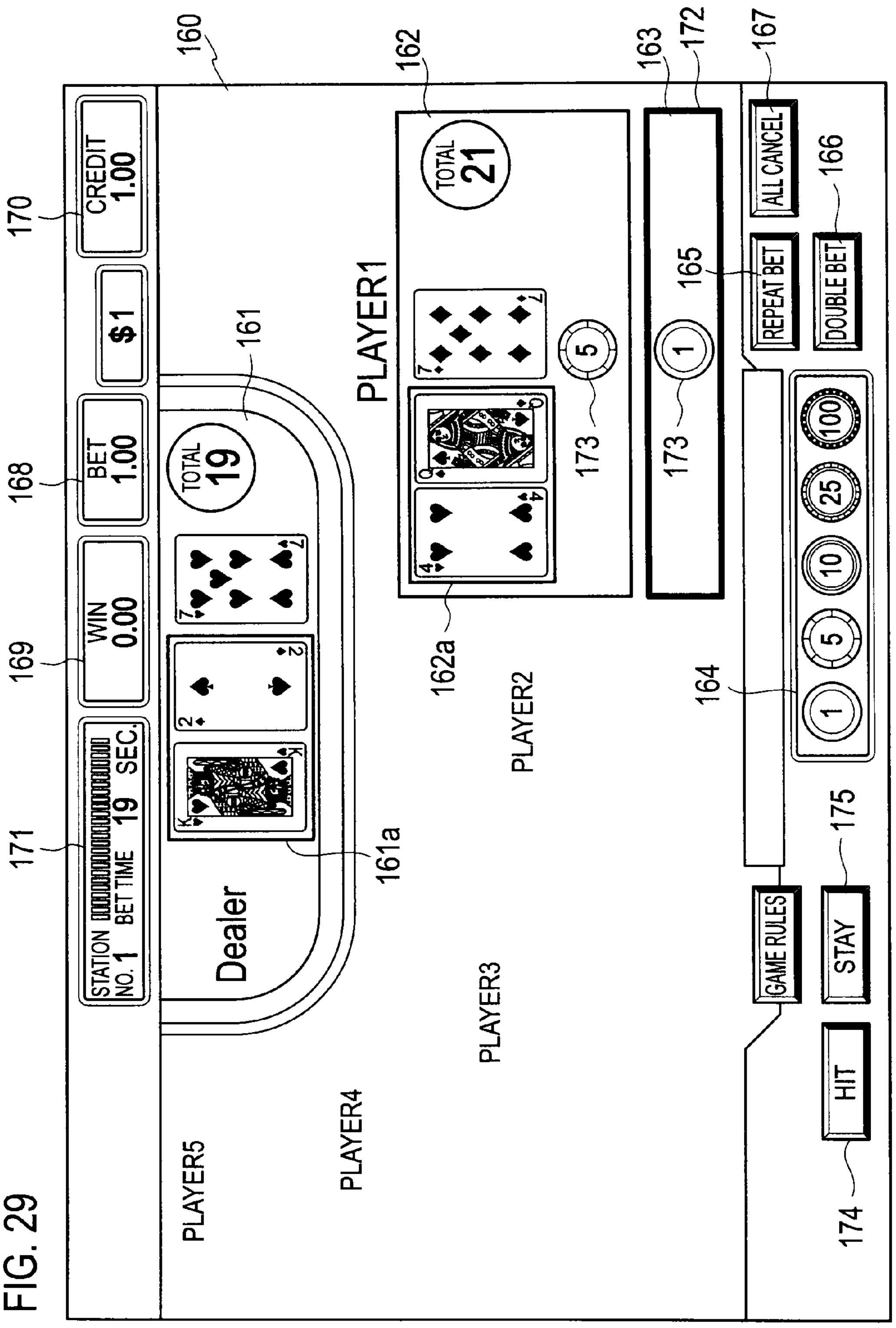
FIG. 29 is a view showing an example of an image to be displayed on the display unit provided on the gaming terminal in FIG. 7.

When all the players of the gaming terminals 104 fix the hands by operating the stay button 175, the first card of dealer displayed in the dealer card areas 161 and 102*a* on the BET screen 160 of each of the gaming terminals 104 and the common display unit 102 is faced up as shown in FIG. 27 and FIG. 28. Now, when the hand of the dealer is 16 or less, additional cards are displayed and faced up one-by-one in the dealer card areas 161 and 102*a* on the BET screen 160 of each of the gaming terminals 104 and the common display unit 102 as shown in FIG. 29 and FIG. 30 until the hand of the dealer becomes 17 or more.

Figure 31:
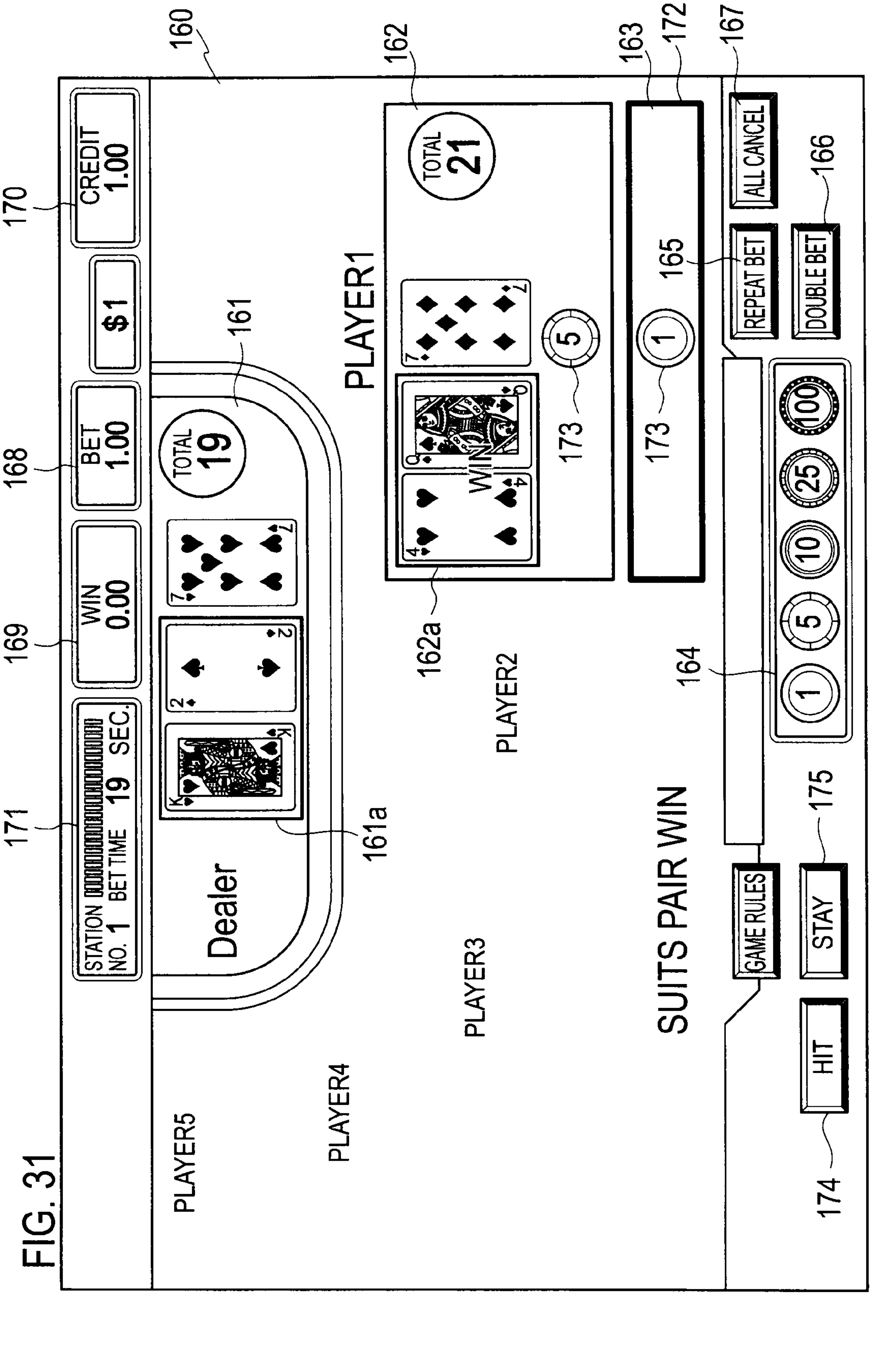
FIG. 31 is a view showing an example of an image to be displayed on the display unit provided on the gaming terminal in FIG. 7.
Figure 32:
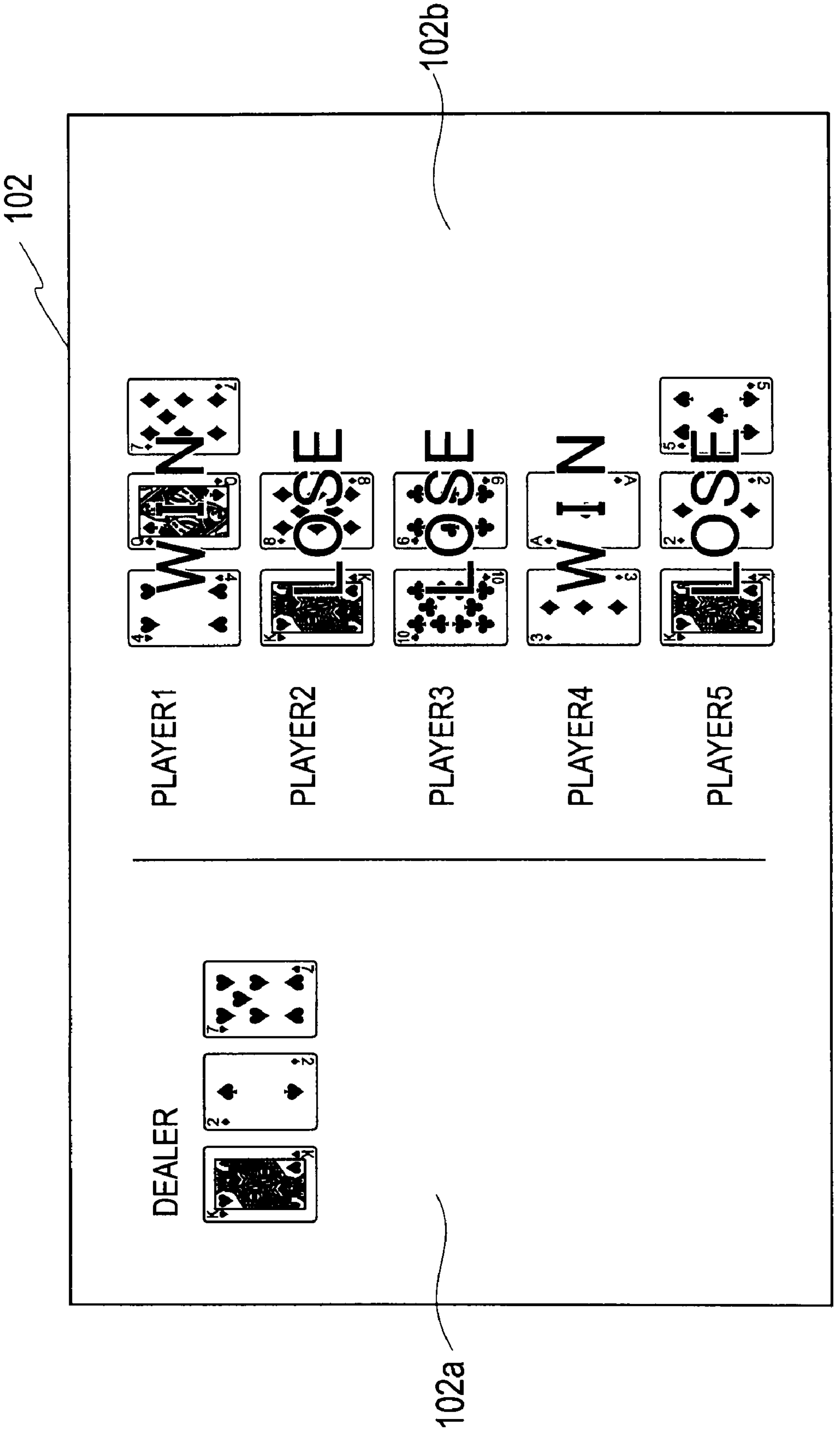
FIG. 32 is a view showing a display example of the basic game of blackjack to be displayed on the common display unit in FIG. 6.

Thereafter, when the hand of the dealer becomes 17 or more, characters showing whether each player wins (WIN) or loses (LOSE) against the dealer in the basic game are respectively displayed on the player card areas 102*b* and 162 on the common display unit 102 and the BET screen 160 of each of the gaming terminals 104 as shown in FIG. 31 and FIG. 32.

Further, when the first and second cards of the player satisfy the contents to establish any of the winning pattern shown on the list in FIG. 5 in the first and second cards of the dealer, characters indicating the established winning pattern and the winning in the side bet game are displayed near the side bet area 163 on the BET screen 160 of the corresponding gaming terminal 104, as shown in FIG. 31.

Figure 30:
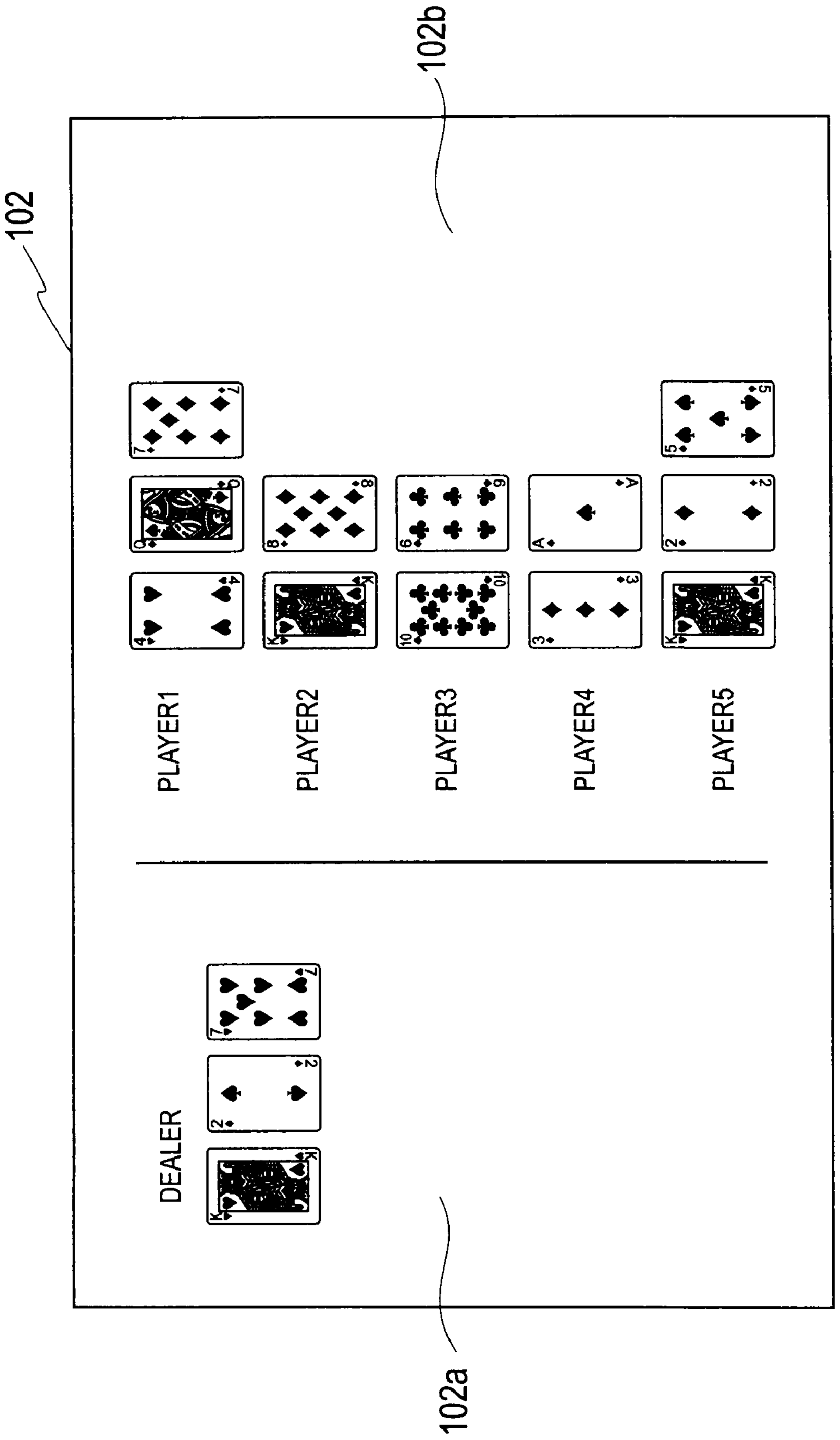
FIG. 30 is a view showing a display example of the basic game of blackjack to be displayed on the common display unit in FIG. 6.

For example, if the first and second cards of the dealer and the player have the contents as shown in the first and second columns from the left in FIG. 30, then the winning pattern "SUITES PAIR" is established for a player 1, the winning pattern "SINGLE MATCH" is established for a player 2, and the winning pattern "DOUBLE NUMBER" is established for a player 5. Accordingly, if the players 1, 2, and 5 bet chips on the side bet games, then the chips in the amount of 1 time, 1.5 times, and 2 times the bet chips will be provided as the payouts for the side bet game, respectively.

In the above-described blackjack game system 101 according to the first embodiment of the present invention, each player can voluntarily make a bet on the side bet game through the gaming terminal 104, which is to be played by use of the first and second cards of the dealer and the player dealt for the basic game, in addition to making a bet on the main game of blackjack to be displayed on the common display unit 102. For this reason, each player participating in the basic game can also participate in the side bet game having the different rule from the basic game in one card game at the player's discretion. In this way, it is possible to increase a variety of card games that the player can enjoy with respect to the time required for the card games, and thereby to enhance a sense of satisfaction of the player with the card games.

Note that, processing to be carried out by the server controlling CPU 113*a* in step S114 in FIG. 16 is the processing of transmitting the control signals indicating the card to be added to the hand of the player of the basic game, to the CPU 103*a* of the game controller 103, and to the terminal controlling CPU 104*a* of the gaming terminal 104 with which the player operates the hit button 174. Here, the processing may be carried out any time after the wins and losses of the players in the basic game as well as the wins and losses of the side bet game for the gaming terminals 104 making bets of medals in the side bet area 163 are determined by the server controlling CPU 113*a*. The same applies to the timing to execute the initial hand determination processing in step S109 in FIG. 16.

Meanwhile, this embodiment is configured to display the win of loss in the side bet game on the display unit 108 (the BET screen 160) of each of the gaming terminals 104 simultaneously with the win or loss in the basic game. However, it is also possible to employ a configuration to display the win or loss in the side bet game on the display unit 108 (the BET screen 160) of each of the gaming terminals 104 at the point when the two cards are dealt to the dealer and the player (at the point when the first card of the dealer is faced down) and prior to the win or loss in the basic game.

A blackjack game system according to a second embodiment of the present invention employs the aforementioned configuration. The blackjack game system of the second embodiment includes the contents of the server side gaming processing which is executed by the server controlling CPU 113*a* of the server 113 in accordance with the program stored in the ROM 113*b*, and the contents of the processing during the game which is executed by the terminal controlling CPU 104*a* of each of the gaming terminals 104 in accordance with the program stored in the ROM 104*b*. Here, the above-mentioned contents are different from those of the processing in the blackjack game system according to the first embodiment as shown in FIG. 16 and FIG. 21.

Figure 33:
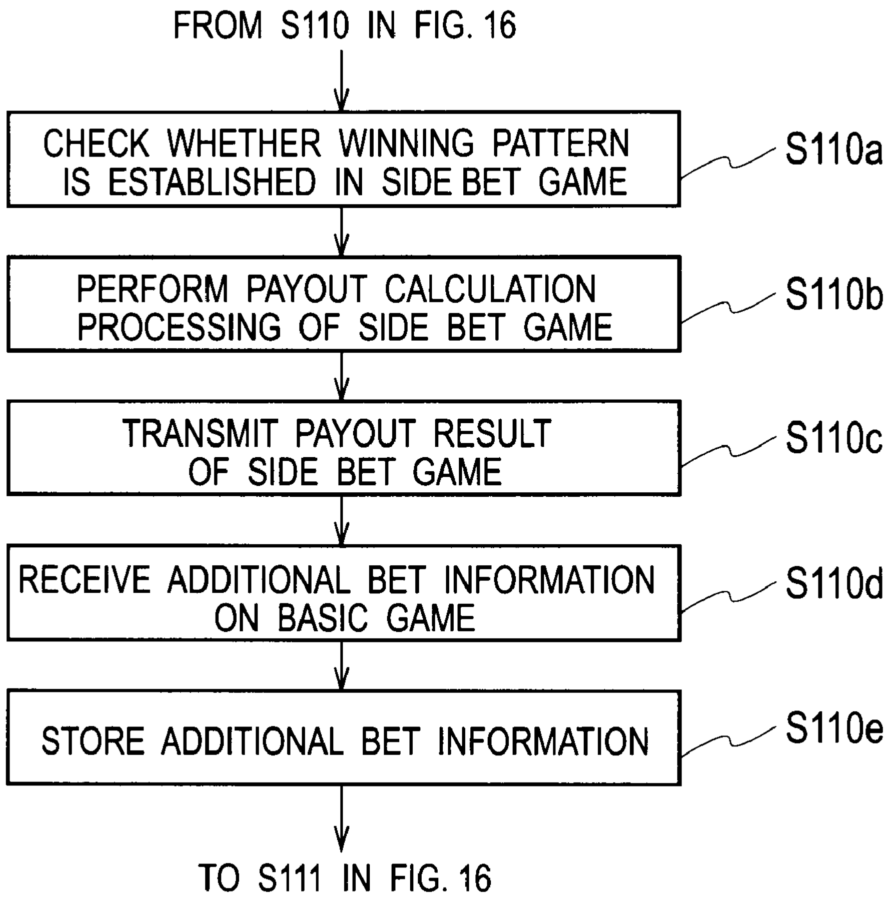
FIG. 33 is a flowchart showing gaming processing by a server in a blackjack game system according to a second embodiment of the present invention.
Figure 34:
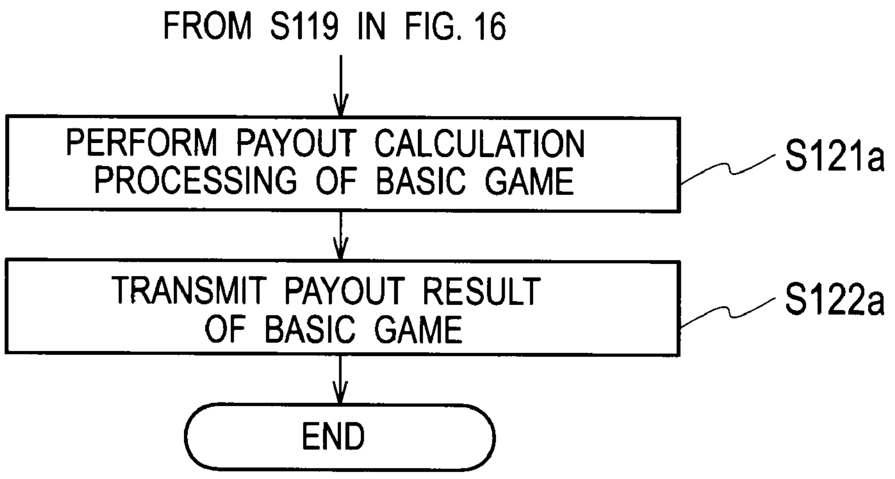
FIG. 34 is another flowchart showing the gaming processing by the server in the blackjack game system according to the second embodiment of the present invention.

Now, the contents of the processing which are different from those used for the first embodiment will be described with reference to FIG. 33 to FIG. 35. First, the server controlling CPU 113*a* of the server 113 executes the processing in the step S110 in FIG. 16 in the server side gaming processing. Thereafter, on the basis of the bet information of each gaming terminal 104 received in Step 107 in FIG. 16 and the contents of initial hands of the dealer and players determined in Step 109 in FIG. 16, the server controlling CPU 113*a* of the server 113 checks the presence or absence of any of the winning patterns established in the side bet game for each of the gaming terminals 104 making the bet of chips on the side bet game as shown in FIG. 33 (step S110*a*).

Next, the server controlling CPU 113*a* executes the payout calculation processing for the side bet game in step S110*b*. Here, the amount of payout of credits to be provided to each of the gaming terminals 104 establishing the winning pattern in the side bet game is calculated in this payout calculation processing for the side bet game.

The payout calculation processing for the side bet game is executed for each of the gaming terminals 104 establishing the winning pattern in the side bet game by use of the payout rates (the number of payout credits per chip (for each bet)) for the winning patterns as defined on the list in FIG. 5, which are stored in the side bet game payout storage area 113B of the ROM 113*b*.

Next, in step S110*c*, the server controlling CPU 113*a* performs the transmission processing of the result of credit payout provided in conjunction with the side bet game based on the payout calculation processing for the side bet game in step S110*b*. To be more precise, the credit data corresponding to the amount of payout for the side bet game are outputted to the terminal controlling CPU 104*a* of the gaming terminal 104 establishing the winning pattern in the side bet game.

Next, in step S110*d*, the server controlling CPU 113*a* receives additional bet information (the number of chips (the number of bets) additionally bet on the player card area 162) inputted by the player at each of the gaming terminals 104 from the terminal controlling CPU 104*a* and stores the information additionally to the bet information storage area 113C in the RAM 113*c* (step S110*e*). After the processing in step S110*e*, the processing goes to step S111 in FIG. 16.

Meanwhile, after the processing in step S119 of FIG. 16 in the server side gaming processing performed by the server controlling CPU 113*a* of the server 113, the server controlling CPU 113*a* of the server 113 executes the payout calculation processing for the basic game in step S121*a*. Here, the amount of payout of credits to be provided to each of the gaming terminals 104 winning against the dealer in the basic game is calculated in this payout calculation processing for the basic game.

The payout calculation processing for the basic game is executed for each of the gaming terminals 104 winning against the dealer in the basic game by use of the payout rates (the number of payout credits per chip (for each bet)) as defined on the list in FIG. 4, which are stored in the basic game payout storage area 113A of the ROM 113*b*.

Next, in step S122*a*, the server controlling CPU 113*a* performs the transmission processing of the result of credit payout provided in conjunction with the basic game based on the payout calculation processing for the basic game in step S121*a*. To be more precise, credit data corresponding to the amount of payout for the basic game are outputted to the terminal controlling CPU 104*a* of the gaming terminal 104 winning against the dealer in the basic game and to the controller controlling CPU 103*a* of the game controller 103. This sub-routine is completed after the processing in step S122*a*.

Figure 35:
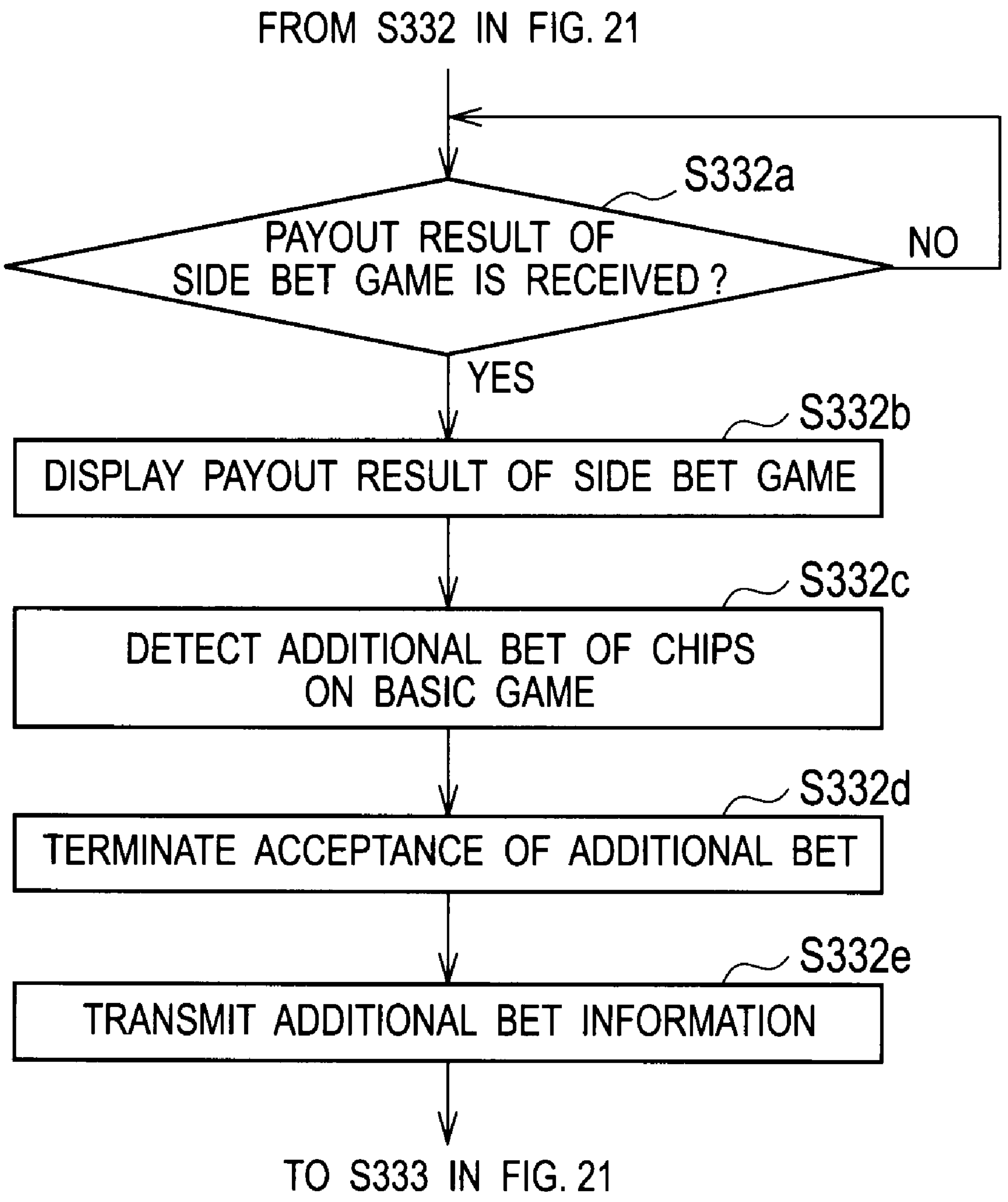
FIG. 35 is a flowchart showing processing during the game by a gaming terminal in the blackjack game system according to the second embodiment of the present invention.

Next, in the processing during the game in step S303 of FIG. 18 which is executed by the terminal controlling CPU 104*a* of the gaming terminal 104 in accordance with the program stored in the ROM 104*b*, the terminal controlling CPU 104*a* of the gaming terminal 104 checks whether or not the terminal controlling CPU 104*a* receives the payout result of credits for the side bet game transmitted from the server controlling CPU 113*a* as shown in FIG. 35, after the processing in step S332 of FIG. 21 (step S332*a*). The terminal controlling CPU 104*a* repeats step S332*a* if no payout result of credits is received (NO in steps S332*a*).

On the other hand, when the payout result for the side bet game is received (YES in step S332*a*), the terminal controlling CPU 104*a* displays the outcome of the side bet game on the BET screen 160 of the gaming terminal 104 in steps S332*b*, based on the payout result received in step S332*a*.

Next, in step S332*c*, the terminal controlling CPU 104*a* detects an additional bet of chips on the basic game by the player, which is made somewhere from a point of display of the side bet game on the BET screen 160 to a lapse of a predetermined period. Detection of the additional bet of chips on the basic game is carried out in such a way that the touch panel 150 detects the player's action such as the pressing of the player card area 162 or the pressing of the chips in stock in the chip box area 164 on the BET screen 160. When the additional bet of chips is detected, the display contents of the chip mark 173 in the player card area 162 on the display unit 108 is updated according to the number of chips for the bet.

Next, in step S332*d*, the terminal controlling CPU 104*a* terminates acceptance of the betting operation using the touch panel 150. Thereafter, the terminal controlling CPU 104*a* transmits the additional bet information (the number of chips (the number of additional bets) made on the player card area 162) inputted by the player using the gaming terminal 104 to the server controlling CPU 113*a* (step S332*e*). After the processing in step S332*e*, the processing goes to step S333 in FIG. 21.

According to the blackjack game system 101 of the second embodiment of the present invention having the above-described configuration, the outcome of the side bet game is determined at the point of displaying the two cards in the dealer card area 161 and the two cards in the player card area 162 on the BET screen 160 of each of the gaming terminals 104 as shown in FIG. 23.

Figure 36:
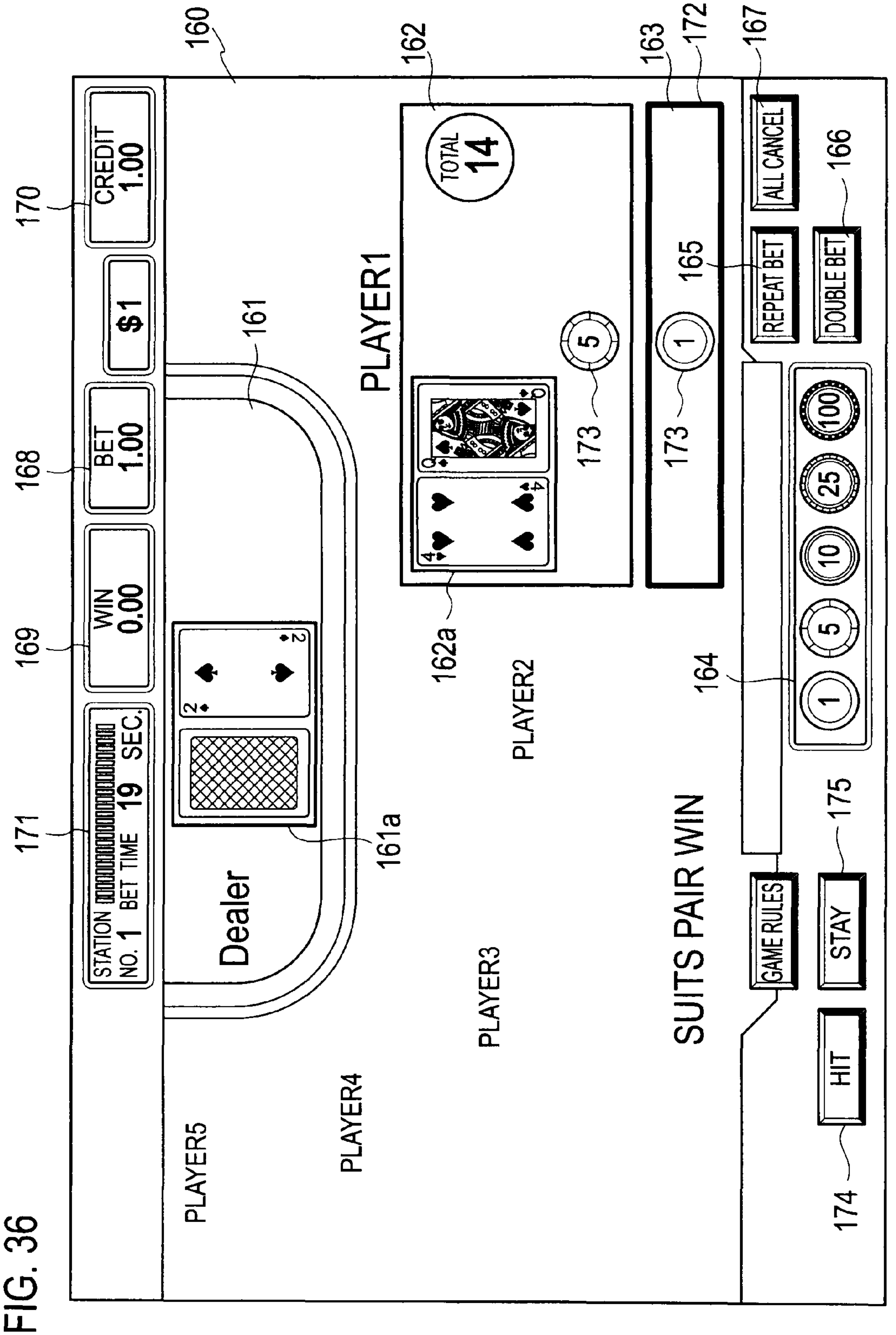
FIG. 36 is a view showing an example of an image to be displayed on the display unit provided on the gaming terminal in FIG. 7 in the blackjack game system according to the second embodiment of the present invention.
Figure 37:
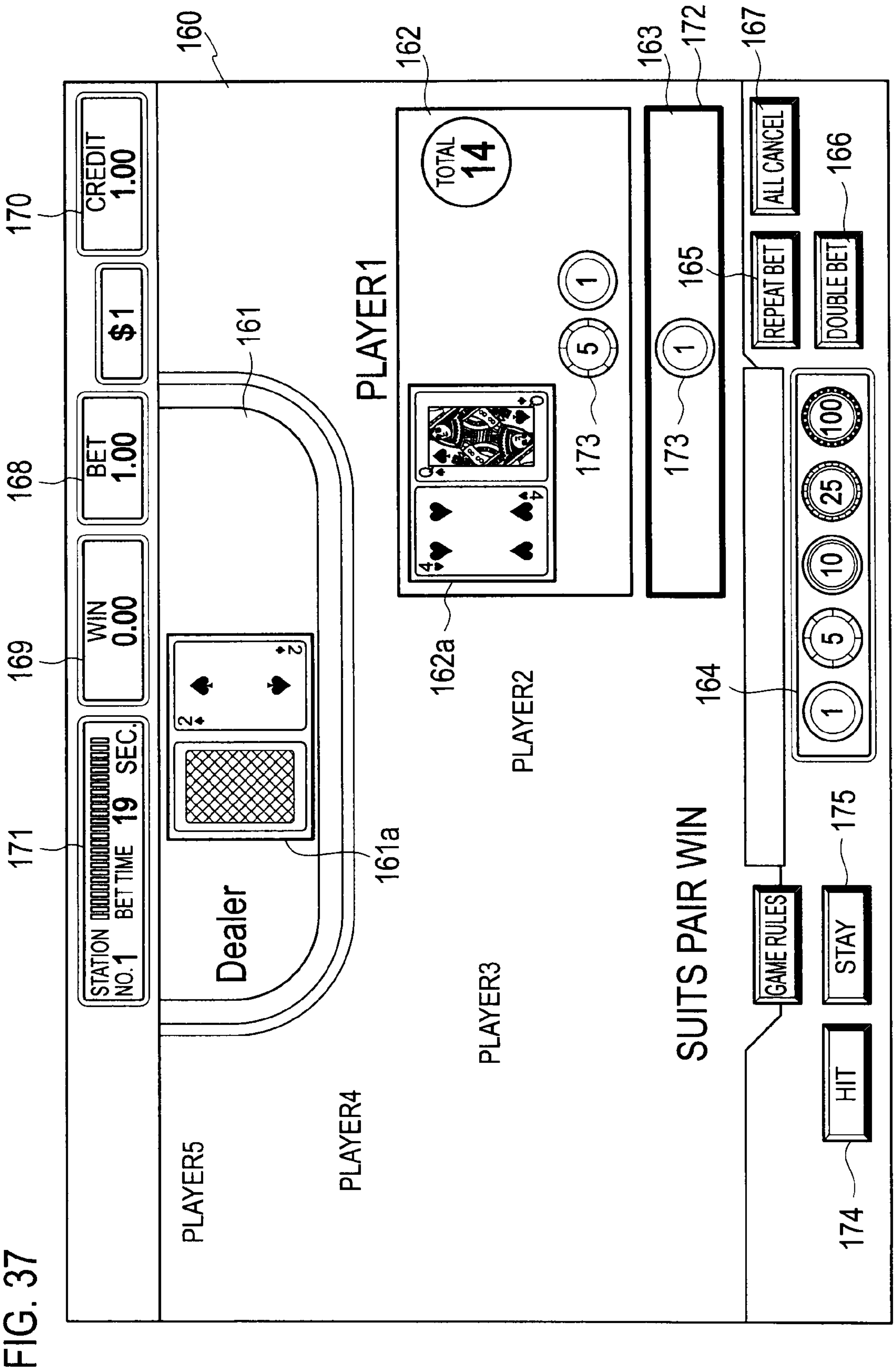
FIG. 37 is a view showing another example of an image to be displayed on the display unit provided on the gaming terminal in FIG. 7 in the blackjack game system according to the second embodiment of the present invention.

Further, as shown in FIG. 36, the characters indicating the established winning pattern and the winning in the side bet game are displayed near the side bet area 163 on the BET screen 160 of the gaming terminal 104 establishing the winning pattern in the side bet game.

Then, an additional bet of chips can be made on the basic game from that time until the lapse of the predetermined period. Detection of the additional bet of chips on the basic game is carried out in such a way that the touch panel 150 detects the player's action such as the pressing of the player card area 162 or the pressing of the chips in stock in the chip box area 164 on the BET screen 160. Upon detection of the additional bet of chips, the display contents of the chip mark 173 in the player card area 162 on the display unit 108 is updated according to the number of chips for the bet. When the chips are additionally bet on the basic game, the chip mark 173 equivalent to the additional bet is additionally displayed in the player card area 162 on the BET screen 160 as shown in FIG. 36.

After the additional bet period of chips on the basic game is over, the processing similar to the blackjack game system of the first embodiment is executed. However, only the characters showing whether each player wins (WIN) or loses (LOSE) against the dealer in the basic game will be newly displayed on the BET screen 160 of each of the gaming terminals 104 after determination of the outcome of the basic game.

According to the blackjack game system 101 of the second embodiment of the present invention having the above-described configuration, an additional bet of chips can be made on the basic game even after the outcome of the side bet game is found out. For this reason, when the winning pattern is established in the side bet game, the player can use the payout as resources for the additional bet of chips on the basic game to get a big payout at a time. On the other hand, when a winning pattern is not established in the side bet game, the player can cover the loss in the side bet game with an additional payout in the basic game by making the additional bet thereon. Accordingly, by allowing an additional bet of chips on the basic game after the outcome of the side bet game is found out, the player's satisfaction and excitement can be further enhanced in playing the card games.

Meanwhile, in the blackjack game system 101 according to any of the first and second embodiments described above, a configuration to provide a payout in accordance with the winning pattern having the highest payout rate may be employed if two or more winning patterns are established at the same time in the side bet game.

Specifically, the "DOUBLE NUMBER" is defined as the case where the first and second cards of the dealer and the player include a combination of two cards having the same ranks regardless of whether the suits of the cards are the same or not. Meanwhile, the "SUITS PAIR" is defined as the case where the first and second cards of the dealer and the player include the combinations of two cards having the same suits regardless of whether the ranks of the cards are the same or not.

Figure 38:
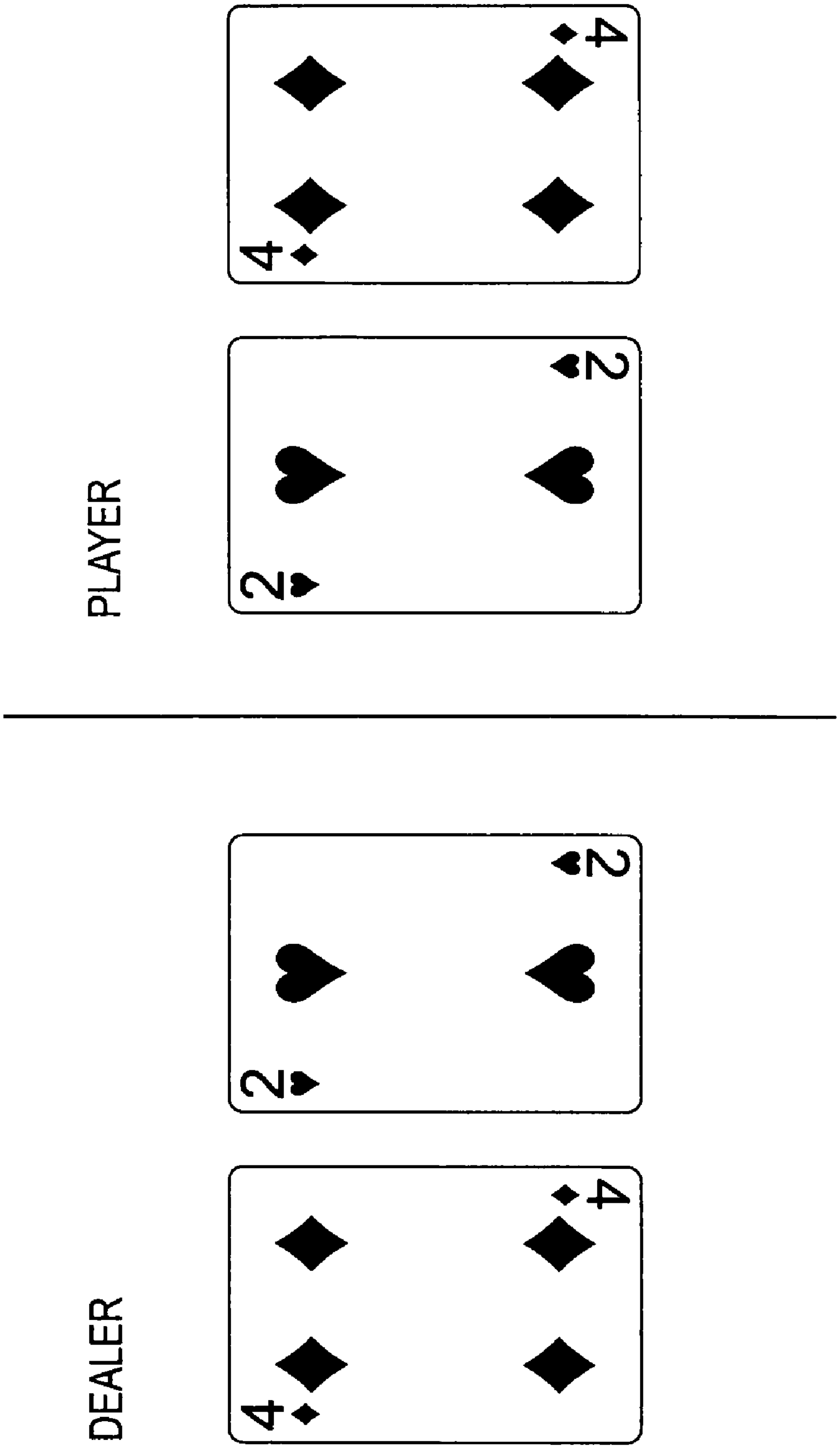
FIG. 38 is a view showing an example of first and second cards of a dealer and a player to determine a winning pattern of a side bet game in the blackjack game systems according to the first and second embodiments of the present invention.

Here, the first and second cards of the player shown in FIG. 38 have the same combination of the ranks and the same combination of the suits as compared to the first and second cards of the dealer. Therefore, two winning patterns of the "DOUBLE NUMBER" and the "SUITS PAIR" are established for the player at the same time. In this case, the payout rate of the "DOUBLE NUMBER" is defined higher than the payout rate of the "SUITS PAIR". Accordingly, the payout corresponding to the "DOUBLE NUMBER" is provided to the player. In the blackjack game system 101 according to the first embodiment, this processing is executed in step S121 on the flowchart in FIG. 16. Meanwhile, in the blackjack game system 101 according to the second embodiment, this processing is executed in step S110*b* on the flowchart in FIG. 33.

According to a gaming machine according to the embodiments of the present invention and a controlling method thereof, it is possible to: allow a participant to play multiple types of card games at the same time per card game; increase a variety of card games that the player can enjoy with respect to the time required for the card games; and enhance a sense of satisfaction of the player with the card games.

The embodiments of the present invention have been described above. However, the present invention is not limited to the embodiments and may be embodied in other specific forms without departing from the spirit or essential characteristics thereof. Moreover, the effects described in the embodiment of the present invention are only a list of optimum effects achieved by the present invention. Hence, the effects of the present invention are not limited to those described in the embodiments of the present invention.

For example, the first embodiment and the second embodiment describe the blackjack game system 101 as an example of the system using blackjack as the card game. However, the present invention is also applicable to a system using a card game other than blackjack as the main card game if such a card game is played by dealing two or more cards to the dealer and to each player and all the displayed cards are disclosed before the end of the main card game.

In addition, in the detailed description above, the characteristic portions are mainly described in order to make the present invention easily understandable. The present invention is not limited to the embodiments described in the detailed description above, and can be applied to the other embodiments, and its range of application is wide. Also, the terms and the terminology used in the present specification are used only for the purpose of explaining the present invention precisely, and not used for the purpose of limiting the interpretation of the present invention. Also, for those skilled in the art, it should be easy to contemplate other configurations, systems, methods, etc., that are contained in the concept of the present invention, from the content of the invention described in the present specification. Consequently, the description of the scope of claims should be construed as containing equivalent configurations within a range of not deviating from a range of the technical ideas of the present invention. Also, the purpose of the abstract is to make it possible for the patent office, the general public organizations, and technicians and the like who belong to the present technical field and who are not thoroughly familiar with patent and law terms or specialized terms, to quickly judge the technical content and its essence of the present application by a simple search. Consequently, the abstract is not intended to limit the scope of the invention which should be evaluated by the description of the scope of claims. Also, in order to sufficiently understand the purpose of the present invention and the effects specific to the present invention, they should preferably be interpreted by sufficiently referring to the documents and the like that are already disclosed in public.

Also, the detailed description above contains the processing to be executed by a computer. The explanations and expressions in the above are described for the purpose of facilitating the most efficient understanding by those skilled in the art. In the present specification, each step used in deriving one result should be understood as a processing without a self-contradiction. Also, at each step, transmission and reception, recording, etc., of electric or magnetic signals will be carried out. In the processing at each step, such signals are expressed by bits, values, symbols, letters, terms, numbers, etc., but it should be noted that they are used simply because they are convenient for the purpose of explanation. Also, there are cases where the processing at each step is described by an expression common to the human behavior, but the processing described in the present specification is to be executed by various devices in principle. Also, the other configuration required in carrying out each step will be obvious from the above description.

What is claimed is:

1. A gaming machine comprising:

a gaming terminal configured to make a wager on a betting card game including a main card game and an auxiliary card game;

a memory configured to store a first game rule for the main card game and a second game rule for the auxiliary card game; and a controller configured to:

(a) accept a bet of a first wager made at the gaming terminal for participation in the main card game;

(b) accept a bet of a second wager made at the gaming terminal as an option for participation in the auxiliary card game;

(c) determine an outcome of the main card game in accordance with the first game rule, on a basis of at least two cards being displayed and disclosed for the main card game after termination of acceptance of a bet of the first wager; and (d) determine an outcome of the auxiliary card game in accordance with the second game rule, on a basis of an outcome of a comparison between first and second cards dealt to a player and first and second cards dealt to a dealer being displayed for the main card game after termination of acceptance of a bet of the second wager.

2. The gaming machine according to claim 1, further comprising:

a display device adapted to show the cards as displayed, wherein the controller drives the display device to show an image to specify the first and second cards as dealt to the player and the dealer and displayed, when determining the outcome of the auxiliary card game.

3. The gaming machine according to claim 1, wherein the main card game includes a blackjack game.

4. The gaming machine according to claim 1, wherein payout rates for the auxiliary card game comprise payout rates being higher than payout rates for the main card game.

5. A gaming machine comprising:

a gaming terminal configured to make a wager on a betting card game including a main card game and an auxiliary card game;

a memory configured to store a first game rule for the main card game and a second game rule for the auxiliary card game; and a controller configured to:

(a) accept a bet of a first wager made at the gaming terminal for participation in the main card game;

(b) accept a bet of a second wager made at the gaming terminal as an option for participation in the auxiliary card game;

(c) determine an outcome of the auxiliary card game in accordance with the second game rule, on a basis of an outcome of a comparison between first and second cards dealt to a player and first and second cards dealt to a dealer being displayed for the main card game after termination of acceptance of a bet of the second wager; and (d) determine an outcome of the main card game in accordance with the first game rule, on a basis of at least two cards being displayed and disclosed for the main card game after determination of the outcome of the auxiliary game and termination of acceptance of a bet of the first wager.

6. The gaming machine according to claim 5, further comprising:

a display device adapted to show the cards as displayed, wherein the controller drives the display device to show an image to specify the first and second cards as dealt to the player and the dealer and displayed, when determining the outcome of the auxiliary card game.

7. The gaming machine according to claim 5, wherein the main card game includes a blackjack game.

8. The gaming machine according to claim 5, wherein payout rates for the auxiliary card game comprise payout rates being higher than payout rates for the main card game.

9. A gaming machine comprising:

a gaming terminal configured to make a wager on a betting card game including a main card game and an auxiliary card game;

a memory configured to store a first game rule for the main card game and a second game rule for the auxiliary card game;

a display device adapted to show cards displayed for the main card game; and a controller configured to:

(a) accept a bet of a first wager made at the gaming terminal for participation in the main card game;

(b) accept a bet of a second wager made at the gaming terminal as an option for participation in the auxiliary card game;

(c) determine an outcome of the auxiliary card game in accordance with the second game rule, on a basis of an outcome of a comparison between first and second cards dealt to a player and first and second cards dealt to a dealer being displayed for the main card game after termination of acceptance of a bet of the second wager, and drive the display device to show the outcome of the auxiliary card game as determined; and (d) determine an outcome of the main card game in accordance with the first game rule, on a basis of at least two cards being displayed and disclosed for the main card game after driving the display device to show the outcome of the auxiliary card game and termination of acceptance of a bet of the first wager, and drive the display device to show the outcome of the main card game as determined.

10. The gaming machine according to claim 9, wherein the controller drives the display device to show an image to specify the first and second cards as dealt to the player and the dealer and displayed when driving the display device to show the outcome of the auxiliary card game.

11. The gaming machine according to claim 9, wherein the main card game includes a blackjack game.

12. The gaming machine according to claim 9, wherein payout rates for the auxiliary card game comprise payout rates being higher than payout rates for the main card game.

13. A method of controlling a gaming machine for a betting card game including a main card game and an auxiliary card game, the method comprising:

by a controller, accepting a bet of a first wager made at a gaming terminal for participation in the main card game;

accepting a bet of a second wager made at the gaming terminal as an option for participation in the auxiliary card game;

determining an outcome of the main card game in accordance with a game rule for the main card game stored in a memory, on a basis of at least two cards being displayed and disclosed for the main card game after termination of acceptance of a bet of the first wager; and determining an outcome of the auxiliary card game in accordance with a game rule for the auxiliary card game stored in the memory, on a basis of an outcome of a comparison between first and second cards dealt to a player and first and second cards dealt to a dealer being displayed for the main card game after termination of acceptance of a bet of the second wager.

14. The method of controlling a gaming machine according to claim 13, further comprising:

by the controller, driving a display device to show an image to specify the first and second cards as dealt to the player and the dealer and displayed when determining the outcome of the auxiliary card game.

15. The method of controlling a gaming machine according to claim 13, wherein the main card game includes a blackjack game.

16. The method of controlling a gaming machine according to claim 13, wherein payout rates for the auxiliary card game comprise payout rates being higher than payout rates for the main card game.

* * * * *